(12) United States Patent
Cole et al.

(10) Patent No.: US 7,620,373 B2
(45) Date of Patent: Nov. 17, 2009

(54) APPARATUS AND METHOD FOR CALIBRATION OF GAIN AND/OR PHASE IMBALANCE AND/OR DC OFFSET IN A COMMUNICATION SYSTEM

(75) Inventors: Jean-Pierre Joseph Cole, Tracy, CA (US); David A. Rowe, Torrance, CA (US); Craig A. Hornbuckle, Torrance, CA (US)

(73) Assignee: Sierra Monolithics, Inc., Redondo Beach, CA (US)

( * ) Notice: Subject to any disclaimer, the term of this patent is extended or adjusted under 35 U.S.C. 154(b) by 458 days.

(21) Appl. No.: 11/590,278

(22) Filed: Oct. 30, 2006

(65) Prior Publication Data

US 2007/0298733 A1 Dec. 27, 2007

Related U.S. Application Data

(60) Provisional application No. 60/816,240, filed on Jun. 23, 2006.

(51) Int. Cl.
*H04B 1/38* (2006.01)
*H04Q 7/20* (2006.01)

(52) U.S. Cl. .................. 455/73; 455/114.3; 455/126; 455/296; 375/296

(58) Field of Classification Search ............ 455/73, 455/114.1–114.3, 126, 240.1, 296, 310–311, 455/317; 375/296, 345–346
See application file for complete search history.

(56) References Cited

U.S. PATENT DOCUMENTS 6,509,801 B1   1/2003   Lao et al.

(Continued)

FOREIGN PATENT DOCUMENTS

EP   0 598 585 A2   5/1994

OTHER PUBLICATIONS

IEEE 802.16 Working Group on Broadband Wireless Access; http://wirelessMAN.org; IEEE802.16-05/070; IEEE P802.16-2004/Cor1/D5 ("Draft Corrigendum to IEEE Standard for Local and Metropolitan Area Networks—Part 16: Air Interface for Fixed Broadband Wireless Access Systems"); Sep. 16, 2005; SPID 154216881.25436; IEEE-SA Standards Board Form for Submittal of Proposed Standards; Coordination Comments and Responses; pp. 1-6.

(Continued)

*Primary Examiner*—Lee Nguyen
(74) *Attorney, Agent, or Firm*—McDermott Will & Emery LLP

(57) ABSTRACT

A radio frequency transceiver for off-line transmit and receive calibrations includes: a transmit pre-distortion module configured to receive a transmit calibration signal during a transmit calibration mode, a transmit communication signal during a transmit communication operation mode, and one or more transmit calibration adjustment signals; a transmit channel frequency converter; and a transmit calibration module configured to provide the one or more transmit calibration adjustment signals and the transmit calibration signal to the transmit pre-distortion module. It may also include a receive channel frequency converter; a receive pre-distortion module configured to receive a receive calibration signal during the receive calibration mode, a receive communication signal during a receive communication operation mode, and one or more receive calibration adjustment signals; and a receive calibration module configured to provide the one or more receive calibration adjustment signals to the receive pre-distortion module and a receive calibration signal to the transmit pre-distortion module.

18 Claims, 11 Drawing Sheets

U.S. PATENT DOCUMENTS

| | | | |
|---|---|---|---|
| 6,931,343 | B2 | 8/2005 | Webster et al. |
| 6,937,668 | B2 | 8/2005 | Sridharan et al. |
| 7,139,540 | B2 * | 11/2006 | Wu et al. ................. 455/251.1 |
| 7,286,572 | B2 | 10/2007 | Hornbuckle et al. |
| 7,412,006 | B2 * | 8/2008 | Talwalkar et al. ........... 375/284 |
| 2003/0053561 | A1 | 3/2003 | Kuiri et al. |
| 2004/0061644 | A1 | 4/2004 | Lier et al. |
| 2004/0165678 | A1 | 8/2004 | Nadiri |
| 2005/0018787 | A1 | 1/2005 | Saed |
| 2005/0048938 | A1 * | 3/2005 | Sahota .................... 455/127.3 |

OTHER PUBLICATIONS

IEEE 802.16 Working Group on Broadband Wireless Access; http://wirelessMAN.org; IEEE802.16-05/070r1; IEEE P802.16-2004/Cor1/D5 ("Draft Corrigendum to IEEE Standard for Local and Metropolitan Area Networks—Part 16: Air Interface for Fixed Broadband Wireless Access Systems");Sep. 27, 2005; SPID 155215280.7971; IEEE-SA Standards Board Form for Submittal of Proposed Standards; Coordination Comments and Responses; pp. 1-7.

IEEE 802.16 Working Group on Broadband Wireless Access; http://wirelessMAN.org; IEEE802.16-05/070r2; IEEE P802.16-2004/Cor1/D5 ("Draft Corrigendum to IEEE Standard for Local and Metropolitan Area Networks—Part 16: Air Interface for Fixed Broadband Wireless Access Systems"); Sep. 28, 2005; SPID 155250025.28701; IEEE-SA Standards Board Form for Submittal of Proposed Standards; Coordination Comments and Responses; pp. 1-7.

802.16™ IEEE Standard for Local and Metropolitan Area Networks; Part 16: Air Interface for Fixed Broadband Wireless Access Systems; IEEE Std 802.16-2004 (revision of IEEE Std 802.16-2001); IEEE Computer Society and the IEEE Microwave Theory and Techniques Society; Oct. 1, 2004; pp. 1-895.

* cited by examiner

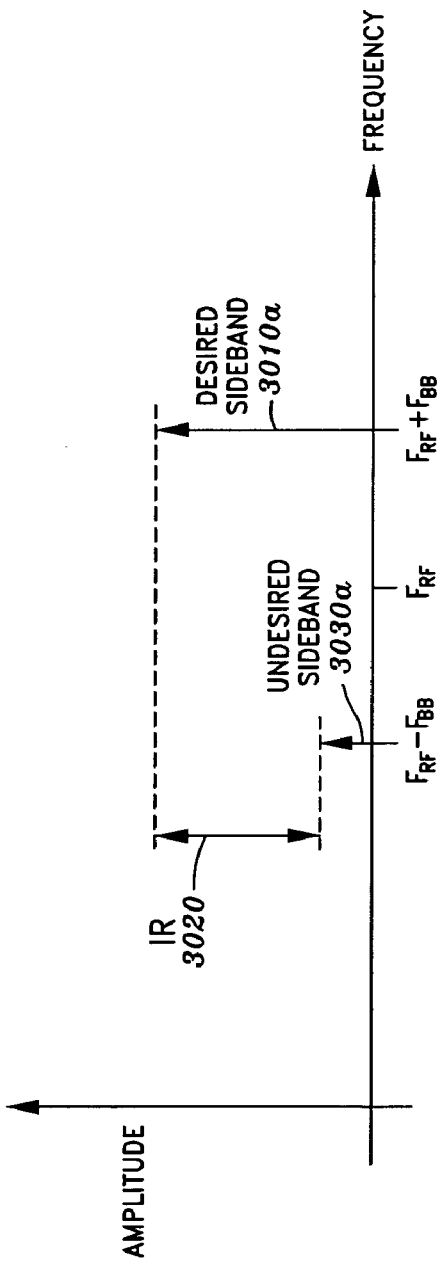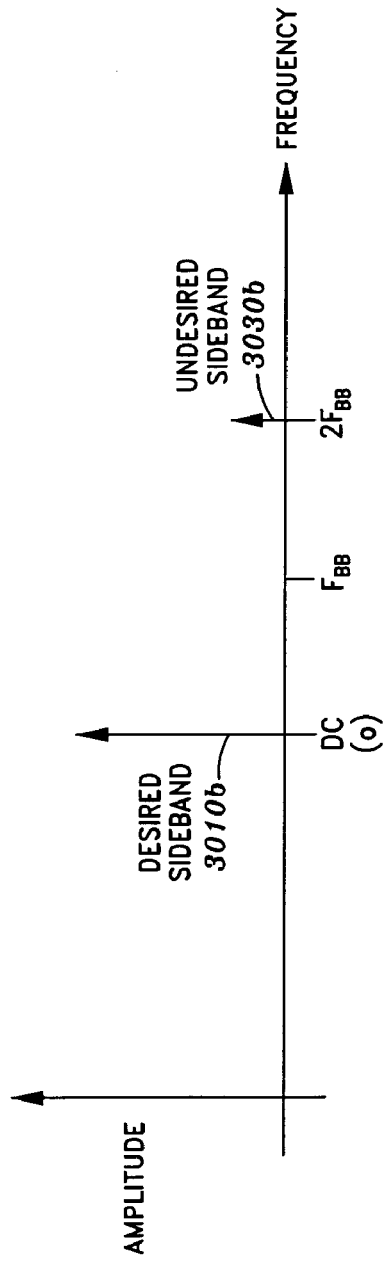
FIG. 3A
FIG. 3B

APPARATUS AND METHOD FOR CALIBRATION OF GAIN AND/OR PHASE IMBALANCE AND/OR DC OFFSET IN A COMMUNICATION SYSTEM

CROSS-REFERENCES TO RELATED APPLICATIONS

The present application claims the benefit of priority under 35 U.S.C. §119 from U.S. Provisional Patent Application Ser. No. 60/816,240 entitled "CALIBRATION OR CORRECTION OF QUADRATURE ERRORS AND/OR DC OFFSET ERRORS IN A TRANSMITTER AND/OR RECEIVER," filed on Jun. 23, 2006, which is hereby incorporated by reference in its entirety for all purposes.

FIELD OF THE INVENTION

The present invention generally relates to error correction and, in particular, relates to apparatus and methods for off-line calibration of gain and phase imbalance and DC offset in a communication system.

BACKGROUND OF THE INVENTION

Telecommunication standards such as the IEEE 802.16 Standard for broadband wireless access (BWA) has imposed clear and often challenging requirements on the radio portion of the communication systems. The most recent revisions have increased channel bandwidth through scalable addition of sub-carriers for the orthogonal frequency division modulation (OFDM) versions of the physical layer (PHY). This increase in bandwidth comes with little relief for the transceiver fidelity requirements. With the introduction of mobility to the standard set, greater power control accuracy has been demanded of the system. All of this comes with no relief in the worldwide regulatory requirements on emissions and receiver robustness.

Counter to these changes in the standards are the never-ending market demands for more functionality and lower cost. The cost pressures have driven many radio frequency integrated circuit (RFIC) system-on-chip (SOC) manufacturers to turn to more space and cost effective architectures such as direct conversion. This architecture comes with inherent performance shortcomings, which need to be mitigated through various on and off-line strategies.

One class of such strategies involves transceiver calibration. To meet the system specifications defined in the telecommunication standards such as the IEEE 802.16 standard, a radio frequency (RF) system needs to be calibrated for gain and phase imbalance. This is critical for communication systems having high signal quality requirements such as a transmitter for which a 30-dB error vector magnitude (EVM) specification applies. EVM is a method for assessing the quality of digitally modulated telecommunication signals. The major contribution to EVM performance is in the transmitter with the power amplifier operating at the maximum output power. The effects of gain and phase imbalance on EVM need to be minimized to have a very small contribution in this case.

SUMMARY OF THE INVENTION

The present invention provides efficient and cost-effective apparatus and method for off-line calibration of gain and phase imbalance and DC offset in communication systems using a calibration signal separate from the communication signal according to one embodiment of the present invention.

According to one embodiment of the present invention, a transceiver system for communication having a transmit channel and a receive channel includes a transmit pre-distortion module including a first transmit input configured to receive a first transmit calibration signal during a transmit calibration mode and configured to receive a first transmit communication signal during a transmit communication operation mode, the transmit pre-distortion module further including a second transmit input configured to receive one or more transmit calibration adjustment signals to adjust the first transmit calibration signal during the transmit calibration mode and configured to receive one or more transmit calibration adjustment signals to adjust the first transmit communication signal during the transmit communication operation mode, the transmit pre-distortion module further including a first transmit output configured to provide a second transmit calibration signal during the transmit calibration mode and configured to provide a second transmit communication signal during the transmit communication operation mode.

The transceiver system also includes a transmit channel frequency converter coupled to the transmit pre-distortion module, the transmit channel frequency converter including a third transmit input configured to receive a third transmit calibration signal during the transmit calibration mode and configured to receive a third transmit communication signal during the transmit communication operation mode, the transmit channel frequency converter further including a fourth transmit input configured to receive a transmit reference signal, the transmit channel frequency converter further including a second transmit output configured to provide a fourth transmit calibration signal during the transmit calibration mode and configured to provide a fourth transmit communication signal during the transmit communication operation mode, the fourth transmit calibration signal including a frequency-translated version of the third transmit calibration signal, the fourth transmit communication signal including a frequency-translated version of the third transmit communication signal.

The transceiver system also includes a transmit calibration module coupled to the transmit channel frequency converter and the transmit pre-distortion module, the transmit calibration module including a fifth transmit input configured to receive a fifth transmit calibration signal during the transmit calibration mode, the transmit calibration module further including a third transmit output configured to provide the one or more transmit calibration adjustment signals for the first transmit calibration signal and the one or more transmit calibration adjustment signals for the first transmit communication signal, the transmit calibration module further including a fourth transmit output configured to provide a sixth transmit calibration signal during the transmit calibration mode.

The transceiver system also includes a receive channel frequency converter including a first receive input configured to receive a first receive calibration signal during a receive calibration mode and configured to receive a first receive communication signal during a receive communication operation mode, the receive channel frequency converter further including a second receive input configured to receive a receive reference signal, the receive channel frequency converter further including a first receive output configured to provide a second receive calibration signal during the receive calibration mode and configured to provide a second receive communication signal during the receive communication operation mode, the second receive calibration signal including a frequency-translated version of the first receive calibration signal, the second receive communication signal including a frequency-translated version of the first receive communication signal.

The transceiver system also includes a receive pre-distortion module coupled to the receive channel frequency converter, the receive pre-distortion module including a third receive input configured to receive a third receive calibration signal during the receive calibration mode and configured to receive a third receive communication signal during the receive communication operation mode, the receive pre-distortion module further including a fourth receive input configured to receive one or more receive calibration adjustment signals to adjust the third receive calibration signal during the receive calibration mode and configured to receive one or more receive calibration adjustment signals to adjust the third receive communication signal during the receive communication operation mode, the receive pre-distortion module further including a second receive output configured to provide a fourth receive calibration signal during the receive calibration mode and configured to provide a fourth receive communication signal during the receive communication operation mode.

The transceiver system further includes a receive calibration module coupled to the receive pre-distortion module, the receive calibration module including a fifth receive input configured to receive a fifth receive calibration signal during the receive calibration mode, the receive calibration module further including a third receive output configured to provide the one or more receive calibration adjustment signals for the third receive calibration signal and the one or more receive calibration adjustment signals for the third receive communication signal, the receive calibration module further including a fourth receive output configured to provide a sixth receive calibration signal during the receive calibration mode.

According to one aspect of the present invention, the transmit calibration module includes a calibration signal generator.

According to another aspect of the present invention, the transmit calibration module includes a plurality of filters configured to separate and provide a first calibration error signal associated with a transmit calibration signal and a second calibration error signal associated with the transmit calibration signal, wherein the first and second calibration error signals are not based on any transmit communication signal.

According to another aspect of the present invention, the first calibration error signal corresponds to an error due to gain and/or phase imbalance, and the second calibration error signal corresponds to an error due to DC offset.

According to another aspect of the present invention, the transceiver system further includes a multiplexer coupled to the receive channel frequency converter, the multiplexer configured to select the first receive calibration signal or the first receive communication signal.

According to another aspect of the present invention, each of the first transmit input, the second transmit input, the third transmit input, the third receive input, the fourth receive input and the fifth receive input includes a plurality of input, wherein each of the first transmit output, the third transmit output, the fourth transmit output, the first receive output, the second receive output, the third receive output and the fourth receive output includes a plurality of output.

According to another aspect of the present invention, each of the first transmit input, the third transmit input, the third receive input, and the fifth receive input is configured to receive in-phase and quadrature-phase signals, wherein each of the first transmit output, the fourth transmit output, the first receive output, the second receive output, and the fourth receive output is configured to provide in-phase and quadrature-phase signals, wherein each of the second transmit input and the fourth receive input is configured to receive in-phase and quadrature-phase calibration values and DC offset calibration values, and wherein each of the third transmit output and the third receive output is configured to provide in-phase and quadrature-phase DC offset calibration values and gain and phase calibration values.

According to another aspect of the present invention, the transmit calibration module is configured not to receive any transmit communication signal, and the receive calibration module is configured not to receive any receive communication signal.

According to another aspect of the present invention, a transceiver system includes a selector coupled to the receive channel frequency converter and the transmit channel frequency converter, wherein the receive calibration module is coupled to the transmit pre-distortion module, wherein during the receive calibration mode, the transceiver system is configured to provide the sixth receive calibration signal to the transmit pre-distortion module, the first transmit input of the transmit pre-distortion module is configured to receive the sixth receive calibration signal, the first transmit output of the transmit pre-distortion module is configured to provide a seventh receive calibration signal based on the sixth receive calibration signal, the third transmit input of the transmit channel frequency converter is configured to receive an eighth receive calibration signal based on the seventh receive calibration signal, and the second transmit output of the transmit channel frequency converter is configured to provide a ninth receive calibration signal based on the eighth receive calibration signal, and the selector is configured to receive the ninth receive calibration signal and to provide the first receive calibration signal to the receive channel frequency converter.

According to another aspect of the present invention, the transmit pre-distortion module is the receive pre-distortion module so that the first transmit input, which is the third receive input, is configured to receive the first transmit calibration signal during the transmit calibration mode, configured to receive the first transmit communication signal during the transmit communication operation mode, configured to receive the third receive calibration signal during the receive calibration mode and configured to receive the third receive communication signal during the receive communication operation mode, the second transmit input, which is the fourth receive input, is configured to receive one or more transmit calibration adjustment signals to adjust the first transmit calibration signal during the transmit calibration mode, configured to receive one or more transmit calibration adjustment signals to adjust the first transmit communication signal during the transmit communication operation mode, configured to receive one or more receive calibration adjustment signals to adjust the third receive calibration signal during the receive calibration mode and configured to receive one or more receive calibration adjustment signals to adjust the third receive communication signal during the receive communication operation mode, the first transmit output, which is the second receive output, is configured to provide the second transmit calibration signal during the transmit calibration mode, configured to provide the second transmit communication signal during the transmit communication operation mode, configured to provide the fourth receive calibration signal during the receive calibration mode and configured to provide the fourth receive communication signal during the receive communication operation mode.

According to another aspect of the present invention, the transmit calibration module includes a detector, calibration receiver, a calibration processor and a microprocessor.

According to another aspect of the present invention, the receive calibration module includes the same calibration processor and the same microprocessor.

According to another aspect of the present invention, a transceiver system includes a selector, wherein the transmit calibration module includes a detector, and the selector is coupled to the detector and the receive channel frequency converter.

According to another aspect of the present invention, the third transmit calibration signal is the second transmit calibration signal, the third transmit communication signal is the second transmit communication signal, the fifth transmit calibration signal is the fourth transmit calibration signal, the sixth transmit calibration signal is the first transmit calibration signal, wherein the third receive calibration signal is the second receive calibration signal, the third receive communication signal is the second receive communication signal, the fifth receive calibration signal is the fourth receive calibration signal, and the first receive calibration signal is generated based on the sixth receive calibration signal.

According to one embodiment of the present invention, a transceiver system for providing a transmit calibration mode, a transmit communication operation mode, a receive calibration mode and a receive communication operation mode includes a transmit sub-system including: a transmit channel frequency converter configured for coupling to or coupled to a calibration signal generator, the calibration signal generator for generating one or more calibration signals, the transmit channel frequency converter including a first transmit input configured to receive a first transmit calibration signal during a transmit calibration mode, the first transmit input configured to receive a first receive calibration signal during a receive calibration mode, the first transmit input configured to receive a first transmit communication signal during a transmit communication operation mode, the transmit channel frequency converter further including a second transmit input configured to receive a transmit reference signal, the transmit channel frequency converter further including a first transmit output configured to provide a second transmit calibration signal during the transmit calibration mode, the first transmit output configured to provide a second receive calibration signal during the receive calibration mode, and the first transmit output configured to provide a second transmit communication signal during the transmit communication operation mode, the second transmit calibration signal including a frequency-translated version of the first transmit calibration signal, the second receive calibration signal including a frequency-translated version of the first receive calibration signal, the second transmit communication signal including a frequency-translated version of the first transmit communication signal.

The transceiver system also includes a signal detector coupled to the transmit channel frequency converter, the signal detector configured to receive a transmit calibration signal during the transmit calibration mode.

The transceiver system also includes a receive sub-system coupled to the transmit sub-system, the receive sub-system including a selector coupled to the transmit channel frequency converter, the selector including an input and an output, the input of the selector configured to receive a third receive calibration signal during the receive calibration mode, the input of the selector configured to receive a first receive communication signal during a receive communication operation mode.

The transceiver system also includes a receive channel frequency converter coupled to the selector, the receive channel frequency converter including a first receive input coupled to the output of the selector, the first receive input configured to receive a fourth receive calibration signal during the receive calibration mode, the first receive input configured to receive a second receive communication signal during the receive communication operation mode, the receive channel frequency converter further including a second receive input configured to receive a receive reference signal, the receive channel frequency converter further including a first receive output configured to provide a fifth receive calibration signal during the receive calibration mode, the first receive output configured to provide a third receive communication signal during the receive communication operation mode, the fifth receive calibration signal including a frequency-translated version of the fourth receive calibration signal, the third receive communication signal including a frequency-translated version of the second receive communication signal.

According to one aspect of the present invention, a transmit sub-system includes a transmit baseband module coupled to the transmit channel frequency converter, the transmit baseband module including one or more filters, the transmit baseband module including an input configured to receive a third transmit calibration signal during the transmit calibration mode, the input of the transmit baseband module configured to receive a sixth receive calibration signal during the receive calibration mode, the input of the transmit baseband module configured to receive a third transmit communication signal during the transmit communication operation mode, the transmit baseband module further including an output configured to provide a fourth transmit calibration signal during the transmit calibration mode, the output of the transmit baseband module configured to provide a seventh receive calibration signal during the receive calibration mode, the output of the transmit baseband module configured to provide a fourth transmit communication signal during the transmit communication operation mode.

According to another aspect of the present invention, a receive sub-system includes a receive baseband module coupled to the receive channel frequency converter, the receive baseband module including one or more filters, the receive baseband module including an input configured to receive an eighth receive calibration signal during the receive calibration mode, the input of the receive baseband module configured to receive a fourth receive communication signal during the receive communication operation mode, the receive baseband module further including an output configured to provide a ninth calibration signal during the receive calibration mode, the output of the receive baseband module configured to provide a fifth receive communication signal during the receive communication operation mode.

According to another aspect of the present invention, a receive sub-system includes a selector coupled to the signal detector and the receive baseband module.

According to another aspect of the present invention, the transmit channel frequency converter is configured for coupling to a transmit pre-distortion module and a transmit calibration module, wherein the receive channel frequency converter is configured for coupling to a receive pre-distortion module and a receive calibration module.

According to one embodiment of the present invention, a radio frequency (RF) transmitter system for communication includes a transmit pre-distortion module including a first transmit input configured to receive a first transmit calibration signal during a transmit calibration mode and configured to receive a first transmit communication signal during a transmit communication operation mode, the transmit pre-distortion module further including a second transmit input configured to receive one or more transmit calibration adjustment signals to adjust the first transmit calibration signal during the transmit calibration mode and configured to receive one or more transmit calibration adjustment signals to adjust the first transmit communication signal during the transmit communication operation mode, the transmit pre-distortion module further including a first transmit output configured to provide a second transmit calibration signal during the transmit calibration mode and configured to provide a second transmit communication signal during the transmit communication operation mode.

The transmitter system also includes a transmit channel frequency converter coupled to the transmit pre-distortion module, the transmit channel frequency converter including a third transmit input configured to receive a third transmit calibration signal during the transmit calibration mode and configured to receive a third transmit communication signal during the transmit communication operation mode, the transmit channel frequency converter further including a fourth transmit input configured to receive a transmit reference signal, the transmit channel frequency converter further including a second transmit output configured to provide a fourth transmit calibration signal during the transmit calibration mode and configured to provide a fourth transmit communication signal during the transmit communication operation mode, the fourth transmit calibration signal including a frequency-translated version of the third transmit calibration signal, the fourth transmit communication signal including a frequency-translated version of the third transmit communication signal.

The transmitter system also includes a transmit calibration module coupled to the transmit channel frequency converter and the transmit pre-distortion module, the transmit calibration module including a calibration signal generator for generating a calibration signal, the transmit calibration module further including a fifth transmit input configured to receive a fifth transmit calibration signal during the transmit calibration mode, the transmit calibration module further including a third transmit output configured to provide the one or more transmit calibration adjustment signals for the first transmit calibration signal and the one or more transmit calibration adjustment signals for the first transmit communication signal, the transmit calibration module further including a fourth transmit output configured to provide a sixth transmit calibration signal from the calibration signal generator during the transmit calibration mode, wherein value or values of the one or more transmit calibration adjustment signals for the first transmit calibration signal are determined during the transmit calibration mode, and value or values of the one or more transmit calibration adjustment signals for the first transmit communication signal are determined during the transmit calibration mode.

According to one aspect of the present invention, a transmit calibration module includes a plurality of filters configured to separate and provide a first calibration error signal associated with a transmit calibration signal and a second calibration error signal associated with the transmit calibration signal, wherein the first and second calibration error signals are not based on any transmit communication signal.

According to another aspect of the present invention, the first calibration error signal corresponds to an error due to gain and/or phase imbalance, and the second calibration error signal corresponds to an error due to DC offset.

According to another aspect of the present invention, a transmit calibration module includes a detector, calibration receiver, a calibration processor and a microprocessor.

According to another aspect of the present invention, the calibration receiver includes one or more analog-to-digital converters, a plurality of bandpass filters and a plurality of detectors.

According to another aspect of the present invention, the calibration processor includes one or more memories, a calibration controller, a look-up table and a calibration signal generator.

According to another aspect of the present invention, a transmit pre-distortion module includes a plurality of multipliers and a plurality of adders.

According to another aspect of the present invention, the first transmit input of the transmit pre-distortion module is coupled to the calibration signal generator of the transmit calibration module, wherein the sixth transmit calibration signal from the calibration signal generator is the first transmit calibration signal.

According to another aspect of the present invention, each of the first transmit input and the third transmit input includes an in-phase input and a quadrature-phase input, wherein each of the first transmit output and the fourth transmit output includes an in-phase output and a quadrature-phase output.

According to one embodiment of the present invention, a radio frequency (RF) receiver system for communication includes a receive channel frequency converter including a first receive input configured to receive a first receive calibration signal during a receive calibration mode and configured to receive a first receive communication signal during a receive communication operation mode, the receive channel frequency converter further including a second receive input configured to receive a receive reference signal, the receive channel frequency converter further including a first receive output configured to provide a second receive calibration signal during the receive calibration mode and configured to provide a second receive communication signal during the receive communication operation mode, the second receive calibration signal including a frequency-translated version of the first receive calibration signal, the second receive communication signal including a frequency-translated version of the first receive communication signal.

The receiver system also includes a receive pre-distortion module coupled to the receive channel frequency converter, the receive pre-distortion module including a third receive input configured to receive a third receive calibration signal during the receive calibration mode and configured to receive a third receive communication signal during the receive communication operation mode, the receive pre-distortion module further including a fourth receive input configured to receive one or more receive calibration adjustment signals to adjust the third receive calibration signal during the receive calibration mode and configured to receive one or more receive calibration adjustment signals to adjust the third receive communication signal during the receive communication operation mode, the receive pre-distortion module further including a second receive output configured to provide a fourth receive calibration signal during the receive calibration mode and configured to provide a fourth receive communication signal during the receive communication operation mode.

The receiver system further includes a receive calibration module coupled to the receive pre-distortion module, the receive calibration module including a calibration signal generator for generating a calibration signal, the receive calibration module further including a fifth receive input configured to receive a fifth receive calibration signal during the receive calibration mode, the receive calibration module further including a third receive output configured to provide the one or more receive calibration adjustment signals for the third receive calibration signal and the one or more receive calibration adjustment signals for the third receive communication signal, the receive calibration module further including a fourth receive output configured to provide a sixth receive calibration signal during the receive calibration mode, wherein value or values of the one or more receive calibration adjustment signals for the third receive calibration signal are determined during the receive calibration mode, and value or values of the one or more receive calibration adjustment signals for the third receive communication signal are determined during the receive calibration mode.

According to one aspect of the present invention, a receive calibration module includes a plurality of filters configured to separate and provide a first calibration error signal associated with a receive calibration signal and a second calibration error signal associated with the receive calibration signal, wherein the first and second calibration error signals are not based on any receive communication signal.

According to another aspect of the present invention, the first calibration error signal corresponds to an error due to gain and/or phase imbalance, and the second calibration error signal corresponds to an error due to DC offset.

According to another aspect of the present invention, a receiver system includes a multiplexer coupled to the receive channel frequency converter, the multiplexer configured to select the first receive calibration signal or the first receive communication signal.

According to another aspect of the present invention, the calibration signal generator is configured to generate the sixth receive calibration signal, and the first receive calibration signal is based on the sixth receive calibration signal.

According to another aspect of the present invention, a receive pre-distortion module includes a plurality of multipliers for receiving in-phase and quadrature phase signals and phase adjustment parameters and a plurality of adders for receiving in-phase and quadrature phase DC offset adjustment parameters.

According to another aspect of the present invention, the receive calibration module includes a calibration receiver, a calibration processor and a microprocessor.

According to another aspect of the present invention, the calibration receiver includes a plurality of bandpass filters, a plurality of square-law blocks and a plurality of adders, wherein the plurality of bandpass filters are configured to separate and provide a first calibration error signal associated with an in-phase of the fifth receive calibration signal and a second calibration error signal associated with a quadrature phase of the fifth receive calibration signal According to one embodiment of the present invention, a method for off-line calibration of a radio frequency (RF) communication system includes steps of: enabling an off-line calibration mode for a radio frequency (RF) communication system; generating an off-line calibration signal; applying to a frequency converter a first off-line calibration signal corresponding to the generated off-line calibration signal; translating the first off-line calibration signal into a second off-line calibration signal, wherein the second off-line calibration signal includes a frequency-translated version of the first off-line calibration signal; detecting a calibration signal corresponding to the second off-line calibration signal; evaluating one or more calibration adjustment signals associated with the calibration signal to reduce error in the communication system; storing one or more calibration adjustment signals; disabling the off-line calibration mode; applying a communication signal; and adjusting the communication signal based on the stored one or more calibration adjustment signals.

According to one aspect of the present invention, the step of detecting a calibration signal includes producing a first signal at a frequency about twice the frequency of the off-line calibration signal.

According to another aspect of the present invention, the step of detecting further includes producing a second signal at a frequency about equal to the frequency of the off-line calibration signal.

According to another aspect of the present invention, the first signal is a sinusoidal signal representing an error due to gain and/or phase imbalance, wherein the second signal is a sinusoidal signal representing an error due to DC offset.

According to another aspect of the present invention, the step of evaluating one or more calibration adjustment signals includes iteratively and independently adjusting the one or more calibration adjustment signals.

According to another aspect of the present invention, the step of evaluating one or more calibration adjustment signals includes: iteratively and independently adjusting a first parameter associated with an in-phase (I) DC offset; iteratively and independently adjusting a second parameter associated with a quadrature-phase (Q) DC offset; iteratively and independently adjusting a third parameter associated with gain imbalance; and iteratively and independently adjusting a fourth parameter associated with phase imbalance, wherein the first parameter is adjusted independently of the second, third and fourth parameters, the second parameter is adjusted independently of the first, third and fourth parameters, the third parameter is adjusted independently of the first, second and fourth parameters, and the fourth parameter is adjusted independently of the first, second and third parameters.

According to another aspect of the present invention, a method includes a step of separating and producing based on the calibration signal (i) a first calibration signal associated with DC offset and (ii) a second calibration signal associated with gain and/or phase imbalance, wherein the step of evaluating one or more calibration adjustment signals includes comparing each of the first calibration signal and the second calibration signal to its associated threshold.

According to another aspect of the present invention, a method includes steps of: filtering a first calibration signal associated with DC offset from the calibration signal; and filtering a second calibration signal associated with gain and/or phase imbalance from the calibration signal.

According to another aspect of the present invention, the step of evaluating one or more calibration adjustment signals is performed during the off-line calibration mode without evaluating the communication signal, and wherein transmission of the communication signal is halted during the off-line calibration mode.

According to another aspect of the present invention, a method includes steps of: generating a next off-line calibration signal having a second frequency, wherein the off-line calibration signal has a first frequency; applying to the frequency converter a first next off-line calibration signal corresponding to the generated next off-line calibration signal; translating the first next off-line calibration signal into a second next off-line calibration signal, wherein the second next off-line calibration signal includes a frequency-translated version of the first next off-line calibration signal; detecting a next calibration signal corresponding to the second next off-line calibration signal; and evaluating one or more calibration adjustment signals associated with the next calibration signal to reduce error in the communication system.

According to another aspect of the present invention, the off-line calibration signal is an off-line transmit calibration signal or an off-line receive calibration signal, the communication signal is a transmit communication signal or a receive communication signal, and the step of detecting a calibration signal includes detecting a transmit calibration signal or receiving a receive calibration signal.

According to another aspect of the present invention, a method includes steps of: enabling an off-line receive calibration mode for the RF communication system; generating an off-line receive calibration signal; applying to a receive channel frequency converter a first off-line receive calibration signal corresponding to the generated off-line receive calibration signal; translating the first off-line receive calibration signal into a second off-line receive calibration signal, wherein the second off-line receive calibration signal includes a frequency-translated version of the first off-line receive calibration signal; receiving a receive calibration signal corresponding to the second off-line receive calibration signal; evaluating one or more calibration adjustment signals associated with the receive calibration signal to reduce error in the communication system; storing one or more receive calibration adjustment signals; and disabling the off-line receive calibration mode, wherein the off-line calibration mode is an off-line transmit calibration mode, the off-line calibration signal is an off-line transmit calibration signal, the communication signal is a transmit communication signal.

According to another aspect of the present invention, a method includes steps of: applying a receive communication signal; and adjusting the receive communication signal based on the stored one or more receive calibration adjustment signals.

According to another aspect of the present invention, a method includes steps of: prior to the step of applying to a receive channel frequency converter, applying to the frequency converter a third off-line receive calibration signal corresponding to the generated off-line receive calibration signal; and translating the third off-line receive calibration signal into a fourth off-line receive calibration signal, wherein the fourth off-line receive calibration signal includes a frequency-translated version of the third off-line receive calibration signal, wherein the first off-line receive calibration signal is based on the fourth off-line receive calibration signal.

According to another aspect of the present invention, a method includes a step of: prior to the step of applying to a receive channel frequency converter, selecting the first off-line receive calibration signal.

According to another aspect of the present invention, a method includes steps of: filtering based on frequency a first calibration signal associated with DC offset from the receive calibration signal, the first calibration signal having a first frequency; and filtering based on frequency a second calibration signal associated with gain and/or phase imbalance from the receive calibration signal, the second calibration signal having a second frequency.

According to one aspect of the present invention, a method includes a step of producing a first signal at a frequency about twice the frequency of the off-line receive calibration signal.

According to another aspect of the present invention, a method includes a step of producing a second signal at a frequency about equal to the frequency of the off-line receive calibration signal.

According to another aspect of the present invention, the first signal is a sinusoidal signal representing an error due to gain and/or phase imbalance, wherein the second signal is a sinusoidal signal representing an error due to DC offset.

According to another aspect of the present invention, the step of evaluating one or more calibration adjustment signals associated with the receive calibration signal includes iteratively and independently adjusting the one or more calibration adjustment signals.

According to another aspect of the present invention, the step of evaluating one or more calibration adjustment signals associated with the receive calibration signal includes: iteratively and independently adjusting a first parameter associated with an in-phase (I) DC offset; iteratively and independently adjusting a second parameter associated with a quadrature-phase (Q) DC offset; iteratively and independently adjusting a third parameter associated with gain imbalance; and iteratively and independently adjusting a fourth parameter associated with phase imbalance, wherein the first parameter is adjusted independently of the second, third and fourth parameters, the second parameter is adjusted independently of the first, third and fourth parameters, the third parameter is adjusted independently of the first, second and fourth parameters, and the fourth parameter is adjusted independently of the first, second and third parameters.

According to another aspect of the present invention, a method includes a step of separating and producing based on the receive calibration signal (i) a first receive calibration signal associated with DC offset and (ii) a second receive calibration signal associated with gain and/or phase imbalance, wherein the step of evaluating one or more calibration adjustment signals associated with the receive calibration signal includes comparing each of the first receive calibration signal and the second receive calibration signal to its associated threshold.

According to another aspect of the present invention, a method includes steps of: filtering a first calibration signal associated with DC offset from the receive calibration signal; and filtering a second calibration signal associated with gain and/or phase imbalance from the receive calibration signal.

According to another aspect of the present invention, the step of evaluating one or more calibration adjustment signals associated with the receive calibration signal is performed during the off-line receive calibration mode without evaluating the receive communication signal, and wherein transmission of the receive communication signal is halted during the off-line receive calibration mode.

According to another aspect of the present invention, a method includes steps of: generating a next off-line receive calibration signal having a second frequency, wherein the off-line receive calibration signal has a first frequency; applying to the receive frequency converter a first next off-line receive calibration signal corresponding to the generated next off-line receive calibration signal; translating the first next off-line receive calibration signal into a second next off-line receive calibration signal, wherein the second next off-line receive calibration signal includes a frequency-translated version of the first next off-line receive calibration signal; receiving a next receive calibration signal corresponding to the second next off-line receive calibration signal; and evaluating one or more calibration adjustment signals associated with the next receive calibration signal to reduce error in the communication system.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

FIG. 3a illustrates an exemplary RF output spectrum in accordance with one embodiment of the present invention.

FIG. 3b illustrates an exemplary output of an envelop detector in accordance with one embodiment of the present invention.

DETAILED DESCRIPTION OF THE INVENTION

Figure 1:
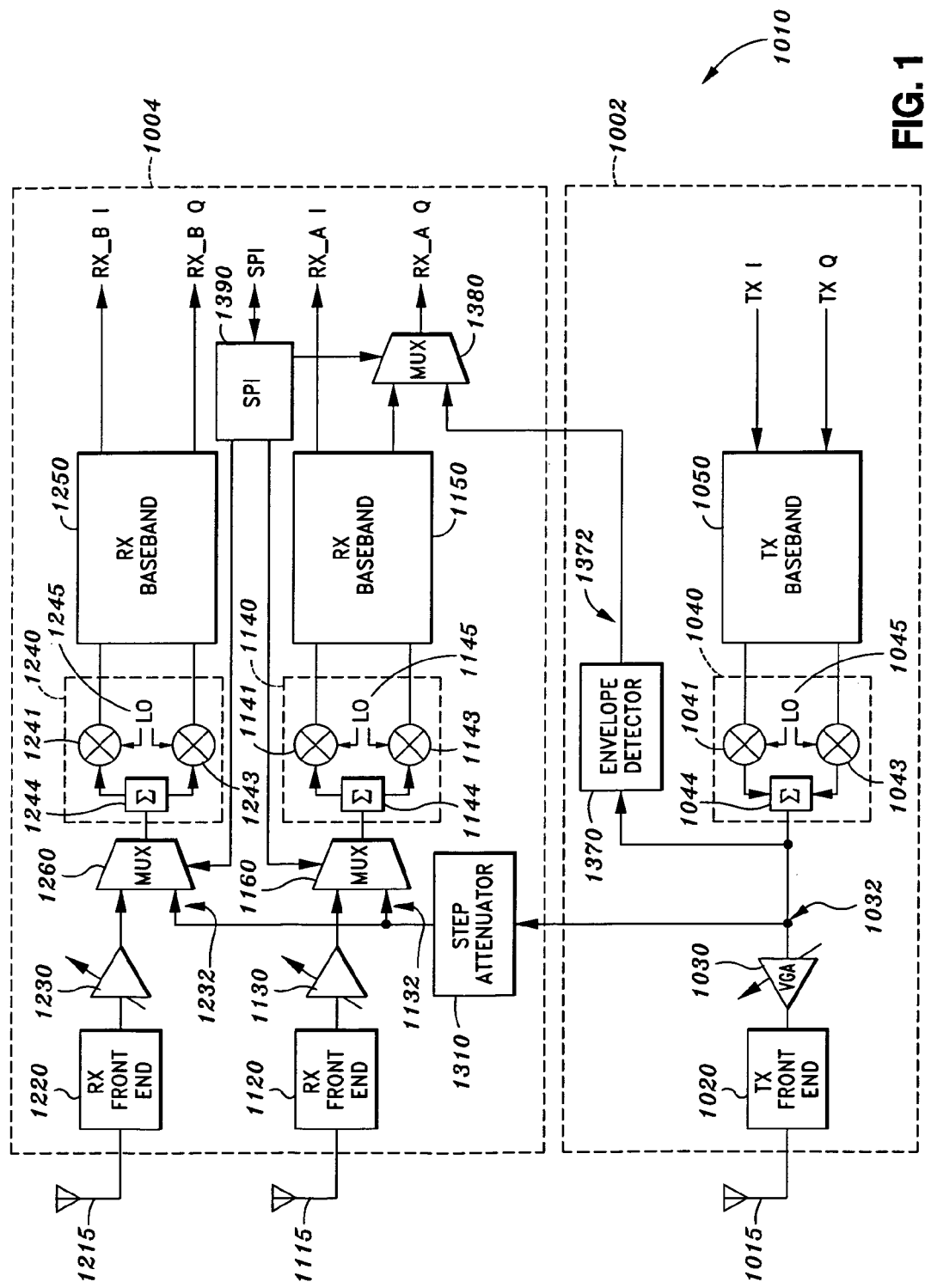
FIG. 1 is a block diagram of a radio frequency (RF) transceiver system in accordance with one embodiment of the present invention.

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail not to obscure the present invention.

Introduction

Transceiver systems and off-line calibration procedures for transceiver systems are described in accordance with one embodiment of the present invention. According to one embodiment, these procedures involve the participation of a baseband subsystem or device. The overall calibration strategy and the technique to be applied may require operation of a radio frequency (RF) subsystem and a baseband subsystem. The procedures herein described make as few assumptions as possible about the baseband device to accommodate a variety of such devices. For any given baseband device, which may have specific calibration features not assumed herein, there may be other calibration strategies with additional benefits. To meet the system specifications defined, for example, in the 802.16 standard, an RF system needs to be calibrated for gain and/or phase imbalance and/or DC offset.

According to one aspect of the present invention, an off-line calibration procedure compensates for the following:

transmit (TX) quadrature imbalance or error (sometimes referred to as TX gain and phase imbalance or error);

TX DC offset (sometimes referred to as TX carrier feedthrough or TX local oscillator (LO) feedthrough);

receive (RX) quadrature imbalance or error (sometimes referred to as RX gain and phase imbalance or error); and RX DC offset (sometimes referred to as RX carrier feedthrough or RX local oscillator (LO) feedthrough).

Calibration Strategy

There are many possible strategies for calibration of a transceiver system. According to one aspect of the present invention, some of the considerations in choosing a strategy are:

Minimal interaction with portions of the system outside the subscriber station (SS) itself, i.e., the base station. If the subscriber station can calibrate itself without relying on other parts of the system, changes in other parts of the system or poor signal reception conditions will not effect the quality of the calibration;

Minimal sources of calibration error resulting from the calibration technique itself;

Simplicity in terms of RF subsystem and baseband (BB) subsystem hardware required to perform the calibration, as well as the interaction needed between the subsystems; and Minimal disruption of normal operation as seen by the user and higher layers of software.

Following these considerations, an exemplary strategy according to one aspect of the present invention is described below:

The mobile station (MS) performs a one-time self calibration upon power-up;

The RF subsystem maintains performance within an acceptable tolerance band relative to the calibrated performance over time and temperature; and The procedure is designed to minimize calibration time in order to have the smallest impact on the user.

It should be noted that the calibration procedure may be performed at other times besides the power-up according to another aspect of the present invention.

In addition, the baseband subsystem requirements according to one aspect of the present invention (beyond the nominal capabilities needed for normal broadband wireless access (BWA) time division duplex (TDD) operation) include:

Being able to apply at least a single quadrature continuous wave (CW) tone to the transmitter baseband input of the transceiver;

Being able to filter and measure the level of the CW tone and its second harmonic concurrent with the application of the calibration tone;

Being able to apply compensating transformations to in-phase (I) and quadrature-phase (Q) data in normal operation; and To minimize calibration time, serial peripheral interface (SPI) reads and writes are synchronously controlled with the signal processing functions of the calibration tone generation and measurement.

Transmitter Balance Calibration

The present invention relates to devices and methods for correcting errors in I-Q signals (quadrature-modulated signals) in transmitters and receivers according to one embodiment of the present invention. According to one aspect of the present invention, transmitter balance calibration measures gain and phase imbalances and DC offset. These measurements are then used by a baseband device to compensate for the imbalances present in a transceiver.

Now referring to FIG. 1, a simplified block diagram of a radio frequency (RF) transceiver system is illustrated in accordance with one embodiment of the present invention. A transceiver system 1010 includes a transmit (TX) module or a transmitter 1002 and a receive (RX) module 1004. The transceiver system 1010 also includes antennas 1015, 1115 and 1215.

According to one embodiment of the present invention, the TX module 1002 and the RX module 1004 are an RF semiconductor integrated circuit chip. The transceiver system 1010 also includes a baseband subsystem (described in detail later) coupled to the TX module 1002 and the RX module 1004 (e.g., a baseband device is coupled to RX_A I, RX_A Q, RX_B I and RX_B Q). The baseband subsystem is a semiconductor integrated circuit chip including various baseband circuit components. In another embodiment, a transceiver system includes a single chip for the TX and RX modules 1002 and 1004 and the baseband subsystem. In yet another embodiment, a transceiver system includes one or more chips for the TX module 1002, one or more chips for the RX module 1004 and one or more chips for the baseband subsystem. In yet another embodiment, discrete components are utilized for some or all of the components of the transceiver system.

In FIG. 1, the TX module 1002 includes a TX front end 1020, a variable gain amplifier (VGA) 1030, a TX channel frequency converter (e.g., a frequency upconverter) 1040, a TX baseband module 1050 and an envelope detector 1370. The TX channel frequency converter 1040 includes an LO 1045, mixers 1041 and 1043 and an adder 1044. According to one aspect, a transmit channel for a communication signal follows a path from TX I and TX Q to the TX baseband module 1050, the TX channel frequency converter 1040, the VGA 1030, the TX front end 1020 and the antenna 1015. The TX front end 1020 may include one or more attenuators, amplifiers and filters.

The RX module 1004 includes two receivers. The first receiver includes a RX front end 1120, a low noise amplifier (LNA) 1130, a multiplexer (MUX) 1160, an RX channel frequency converter (e.g., a frequency downconverter) 1140, an RX baseband module 1150, a MUX 1380, and a SPI 1390. The RX channel frequency converter 1140 includes an LO 1145, mixers 1141 and 1143 and an adder 1144. The second receiver includes an RX front end 1220, a LNA 1230, a MUX 1260, an RX channel frequency converter 1240, and an RX baseband module 1250. The RX channel frequency converter 1240 includes an LO 1245, mixers 1241 and 1243 and an adder 1244. Each of the RX front end 1120 and the RX front end 1220 may include one or more attenuators, amplifiers and filters.

According to one aspect of the present invention, a first receive channel for a communication signal follows a path from the antenna 1115 to the RX front end 1120, the LNA 1130, the MUX 1160, the RX channel frequency converter 1140, the RX baseband module 1150 and to RX_A I and RX_A Q (through the MUX 1380). A second receive channel for a communication signal follows a path from the antenna 1215 to the RX front end 1220, the LNA 1230, the MUX 1260, the RX channel frequency converter 1240, the RX baseband module 1250 and to RX_B I and RX_B Q.

A baseband subsystem (not shown in FIG. 1 but described later with reference to other figures) is coupled to the TX module 1002 and the RX module 1004. The baseband subsystem calibrates a transmitter section of the TX module 1002 (e.g., the TX channel frequency converter 1040 and the TX baseband module 1050) by applying a single-frequency calibration tone to the transmitter input TX I and TX Q while monitoring the output of the envelope detector 1370 placed at an output of the TX module 1002. The envelope detector 1370, the MUX 1380 as well as a feedback path from the TX channel frequency converter 1040 to one of the RX_A I or RX_A Q outputs are implemented on an RF chip. Based on the monitoring and measurement of the output of the envelope detector 1370, a baseband device calculates the errors in gain and phase imbalance and DC offset during the calibration mode. The baseband device then compensates for the RF gain and phase imbalance during normal communication operation.

In accordance with one embodiment of the present invention, the receiver calibration makes use of the calibrated transmitter section (e.g., the TX channel frequency converter 1040 and the TX baseband module 1050) through a feedback path on the RF chip from the transmitter output to the receiver input (i.e., from an output 1032 to inputs 1132 and 1232). The baseband device applies the same calibration tone to the transmitter section (e.g., the TX channel frequency converter 1040 and the TX baseband module 1050) and observes the receiver output (e.g., RX_A I, RX_A Q, RX_B I and RX_B Q). Based on this measurement, the baseband chip calculates the compensation necessary for the gain and phase imbalance and DC offset during the calibration mode and applies this in normal communication operation.

While FIG. 1 shows one transmitter and two receivers, a transceiver may have one or more transmitters and one or more receivers (e.g., a transceiver including one transmitter and one receiver, a transceiver including multiple transmitters and one receiver, or a transceiver including multiple transmitters and multiple receivers).

Figure 2:
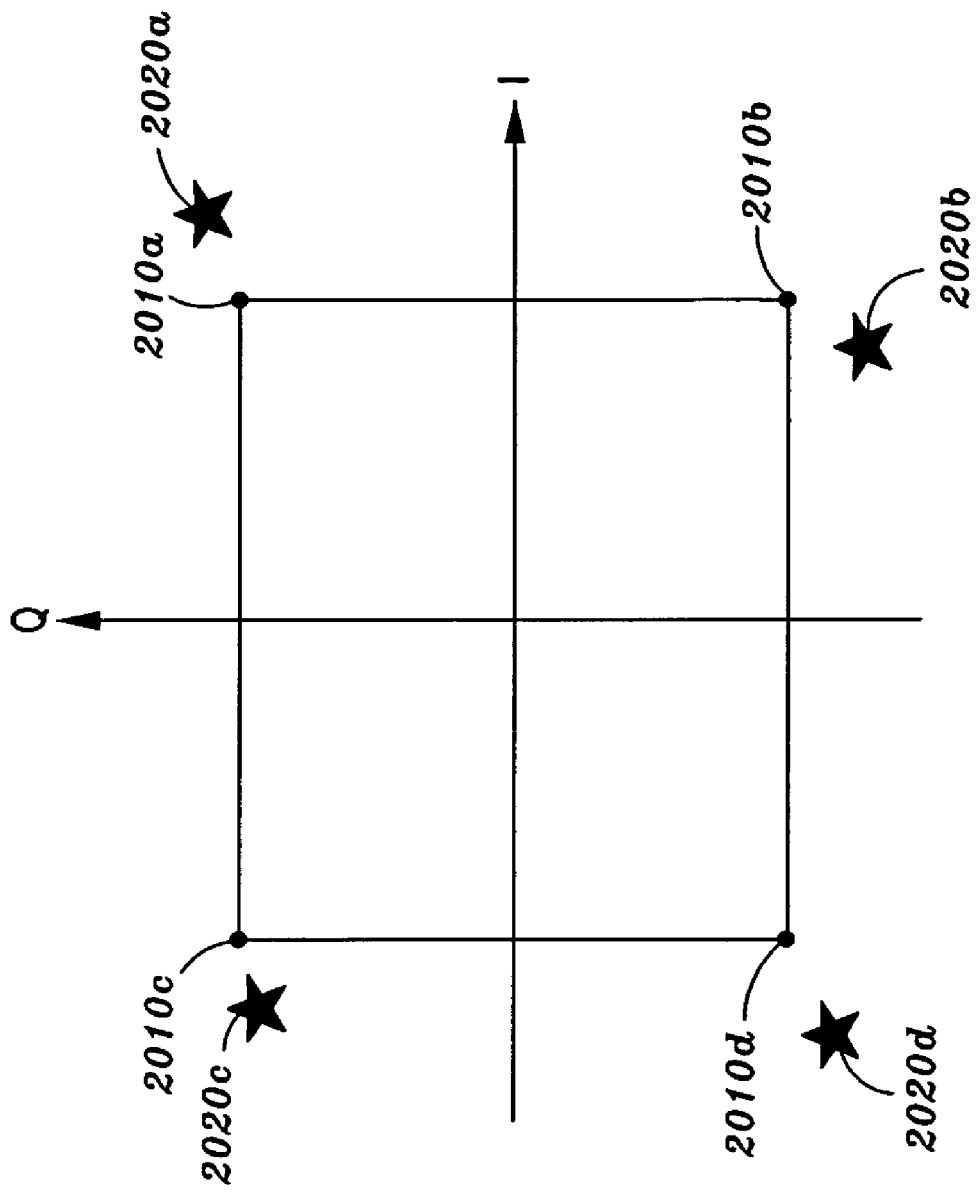
FIG. 2 illustrates an exemplary graph showing desired output signals and actual output signals.

FIG. 2 illustrates an exemplary graph showing desired output signals and actual output signals. In this I-Q graph, the desired output signals at the RF output 1032 are shown as signals 2010a, 2010b, 2010c and 2010d. The actual output signals may be signals 2020a, 2020b, 2020c and 2020d without the calibration or correction performed in accordance with the invention. The present invention provides devices and methods for correcting the DC offset and gain (or amplitude) and phase imbalance. In accordance with one embodiment, the present invention utilizes, among others, one or more baseband devices (such as baseband processors), the envelope detector 1370, the TX channel frequency converter 1040, the TX baseband module 1050, the RX channel frequency converters 1140 and 1240, the RX baseband modules 1150 and 1250 and a feedback path (e.g., the step attenuator 1310 and the MUX's 1160 and 1260) shown in FIG. 1.

Transmitter Quadrature Balance Calibration

Referring to FIG. 1, calibration of gain and phase imbalance is described in accordance with one embodiment of the present invention. In this description, it is first assumed that there is zero DC offset (or zero LO leakage). DC offset is addressed later. The TX channel frequency converter 1040 (or transmitter I/Q upconverter) may be viewed as a single sideband mixer with a zero intermediate frequency (IF) according to one aspect.

If a quadrature tone (e.g., an in-phase (I) sinusoidal tone and a quadrature-phase (Q) sinusoidal tone) is applied at the TX baseband module input TX I and TX Q and assuming perfect quadrature at the TX baseband module 1050 and in the TX channel frequency converter 1040, a single sideband tone should appear at the RF output 1032. The quadrature tone is produced by a baseband device as a sine wave on the I input (TX I) and a cosine wave on the Q input (TX Q) of the TX baseband module 1050. Thus, if $F_{RF}$ is the LO frequency (i.e., the frequency of a LO 1045) and $F_{BB}$ is the calibration tone frequency of a calibration quadrature tone, the single sideband tone at the RF output 1032 appears at frequency $F_{RF}+F_{BB}$.

If there is either gain imbalance in the baseband path, or phase imbalance in the LO 1045 or the mixers 1041 and 1045, the RF output at 1032 will include an unwanted sideband or an undesired sideband at frequency $F_{RF}-F_{BB}$. The level of this sideband relative to the desired sideband is determined by the amount of imbalance. For small imbalances, this relative level, or image rejection, may be approximated by:

$$IR = \frac{\Delta G^2 + \Delta\phi^2}{4} \quad (1)$$

Where: IR=Image rejection power ratio
ΔG=Gain imbalance ratio
Δϕ=Phase imbalance in radians The spectrum at the RF output 1032 is shown in FIG. 3(*a*) according to one aspect of the invention. A desired sideband 3010*a* (a calibration signal or a desired-portion of a calibration signal after upconversion) is shown at frequency $F_{RF}+F_{BB}$, and an undesired sideband 3030*a* (a calibration signal or an undesired portion of a calibration signal after upconversion) is shown at frequency $F_{RF}-F_{BB}$. The image rejection (IR) 3020 is the magnitude difference between the desired sideband 3010*a* and the undesired sideband 3030*a*.

The spectrum at the output 1372 of the envelope detector 1370 is shown in FIG. 3(*b*) according to one aspect of the invention. A desired sideband 3010*b* (a calibration signal or a desired portion of a calibration signal) at DC (or at zero frequency) represents the desired sideband 3010*a* after being converted to a baseband signal by the envelope detector 1370 and produced at the output 1372. An undesired sideband 3030*b* (a calibration signal or an undesired portion of a calibration signal) at frequency $2F_{BB}$ represents the undesired sideband 3030*a* after being converted to a baseband signal by the envelope detector 1370 and produced at the output 1372.

Quadrature balance (or gain and phase balance) may be optimized by minimizing the level of the undesired sideband 3030*b* appearing at frequency $2F_{BB}$ at the output 1372 of the envelope detector 1370. A baseband device (described in detail later) digitizes this signal and processes it with its standard baseband Fast Fourier Transform (FFT) processor to determine its level. According to one aspect of the invention, it is not necessary to measure the relative level of this undesired sideband 3030*b* (a calibration signal or an undesired portion of a calibration signal) with the desired sideband 3010*b* appearing at DC (at zero frequency) or use the relative level in calibrating the errors in the system. The desired sideband 3010*b* may include contribution from any harmonics or LO leakage that appear at the RF output 1372.

To minimize the undesired sideband 3030*b* at $2F_{BB}$, the baseband device introduces a known amount of gain imbalance and observes the associated change in the level of the undesired sideband 3030*b*. This is repeated for phase imbalance. Based on a knowledge of the error surface defined by equation (1) and assuming the envelope detector 1070 to be square law, the baseband device calculates the gain and phase imbalance from a single measure of the gradient of this error surface. If the envelope detector 1370 is proportional to RF voltage over some or most of its range, the baseband device may perform a search for the minimum error by independently adjusting gain and phase imbalance to find the minimum using a least mean squares (LMS) method, the Newton-Raphson method or some other adaptive algorithm.

Transmitter DC Offset

Referring to FIG. 1, although there are other mechanisms, DC offset (or LO leakage) may be produced at the RF output 1372 due to DC offset at the input of the mixers 1041 and 1045 according to one aspect of the present invention. This DC offset may include contributions from the baseband digital-to-analog converter (DAC), the baseband amplifiers, as well as the mixers 1041 and 1045 themselves. This leakage may be minimized by nulling out the DC offset at the baseband input to the transmitter (e.g., at TX I and TX Q).

With DC offset and gain and/or phase imbalance, exemplary RF and envelope detector spectra appear as in FIGS. 4(*a*) and 4(*b*) according to one aspect of the present invention. The spectrum at the RF output 1032 is shown in FIG. 4(*a*) according to one aspect of the invention. A desired sideband 4010*a* (a calibration signal or a desired portion of a calibration signal after upconversion) is shown at frequency $F_{RF}+F_{BB}$, and an undesired sideband 4030*a* (a calibration signal or an undesired portion of a calibration signal after upconversion) is shown at frequency $F_{RF}-F_{BB}$. The image rejection (IR) 4020 is the magnitude difference between the desired sideband 4010*a* and the undesired sideband 4030*a*. Another undesired signal 4040*a* (a calibration signal or another undesired portion of a calibration signal after upconversion) due to DC offset or LO leakage appears at frequency $F_{RF}$.

The spectrum at the output 1372 of the envelope detector 1370 is shown in FIG. 4(*b*) according to one aspect of the invention. A desired sideband 4010*b* (a calibration signal or a desired portion of a calibration signal) at DC (or at zero frequency) represents the desired sideband 4010*a* after being converted to a baseband signal by the envelope detector 1370 and produced at the output 1372. An undesired sideband 4030*b* (a calibration signal or an undesired portion of a calibration signal) at frequency $2F_{BB}$ represents the undesired sideband 4030*a* after being converted to a baseband signal by the envelope detector 1370 and produced at the output 1372. An undesired sideband 4040*b* at frequency $F_{BB}$ represents the undesired sideband 4040*a* after being converted to a baseband signal by the envelope detector 1370 and produced at the output 1372.

When both DC offset and gain and/or phase imbalance are present, the undesired sideband 4040*b* at $F_{BB}$ (due to DC offset) contributes to the undesired sideband 4030*b* at $2F_{BB}$ (due to gain and/or phase imbalance). Since the undesired sideband 4040*b* can be large relative to the undesired sideband 4030*b*, it may be desirable to null the undesired sideband 4040*b* first. A baseband device can discriminate between these sidebands with FFT. In a preferred embodiment, the transmitter calibration begins by adjusting the DC offset at the I and Q inputs to the transmitter 1002 (e.g., TX I and TX Q in FIG. 1) to minimize the undesired sideband 4040*b* due to DC offset. Following this, the process of compensating for gain and phase imbalance proceeds to minimize the undesired sideband 4030*b*. In another embodiment, the gain and phase imbalance may be minimized first and then the DC offset. In yet another embodiment, they may be minimized simultaneously.

Receiver Quadrature Balance Calibration

Referring to FIG. 1, once the transmitter 1002 is calibrated, the receiver 1004 is calibrated using the transmitter 1002 as a source in accordance with one embodiment of the present invention. The RF transceiver chip 1010 includes a loopback (or feedback) path from the transmitter output 1032 to the receiver inputs 1132 and 1232. This path includes variable gain (or LNAs 1130 and 1230) so that the receiver path (e.g., the RX channel frequency converter 1140, the RX baseband 1150 and other baseband devices (described in detail later) coupled to the right of the RX baseband 1150, and the RX channel frequency converter 1240, the RX baseband 1250 and other baseband devices (described in detail later) coupled to the right of the RX baseband 1250 may be calibrated for gain balance at different receiver gain settings. It is desirable to have at least four points across the nominal 30 dB of gain range calibrated. The loopback path has four gain settings which attenuate the output of the transmit mixer to four levels from approximately −30 dBm down to about −60 dBm at the input of the receiver mixers 1141, 1143, 1241 and 1243.

For each calibration point, the signal levels at the I and Q outputs of the receiver (e.g., RX_A I, RX_A Q, RX_B I and RX_B Q in FIG. 1) are set to their nominal levels as during normal automatic gain control (AGC) operation. If more points of calibration are desired in between the four provided, an analog-to-digital converter (ADC) having a more dynamic range may be utilized by allowing the I and Q signal levels to fall below the nominal point.

During an RX calibration mode, the portions of the RF circuitry outside the loopback path (e.g., the TX front end 1020, the RX front end 1120, and the RX front end 1220) are disabled to isolate the calibration signals from anything that would cause them to radiate into the environment. On the transmit side 1002, the VGA 1030 and the drivers on the RF transceiver system 1010 are disabled, and external power amplifier (PA) (not shown) is set in high attenuation mode. External low noise amplifiers (LNAs) in the RX front ends 1120 and 1220 are all disabled.

Aside from calibrating at multiple gain settings, the process for receiver quadrature balance optimization is substantially the same as the process for the transmitter balance calibration according to one embodiment of the present invention. The resulting compensation coefficients for the receive module 1004 are stored by a baseband device for application at different gains.

Receiver DC Offset

Still referring to FIG. 1, this portion of the calibration process compensates for DC offsets in the receive mixer and baseband circuitry in accordance with one embodiment of the present invention. The transceiver system 1010 is capable of reducing the DC offset at the I and Q outputs (e.g., RX_A I, RX_A Q, RX_B I and RX_B Q) to less than 30 mV. Most of the DC offset is a result of LO leakage into the RF port of the mixers (e.g., mixers 1141, 1143, 1241 and 1243) which then is mixed with the LO signal itself down to DC. Since this leakage varies with frequency, the level of offset also varies with frequency. It is desirable to perform this calibration at least at one frequency in each of the frequency bands.

According to one aspect of the present invention, to perform the DC offset calibration, the on-chip receive LNAs 1130 and 1230 in the transceiver system 1010 are set to maximum attenuation or minimum gain, and external LNAs are disabled. The receiver baseband circuitry is set to maximum gain. The baseband device then tunes the receiver to each of the frequencies at which the calibration is to be performed and measures the DC level at the I and Q outputs (e.g., RX_A I, RX_A Q, RX_B I and RX_B Q). The DC offset is compensated by programming the DC offset null digital-to-analog converters (DACs) through the SPI bus. The initial offset compensation needed can be estimated by the expected gain of the baseband section.

Baseband Filter Tuning

Figure 12:
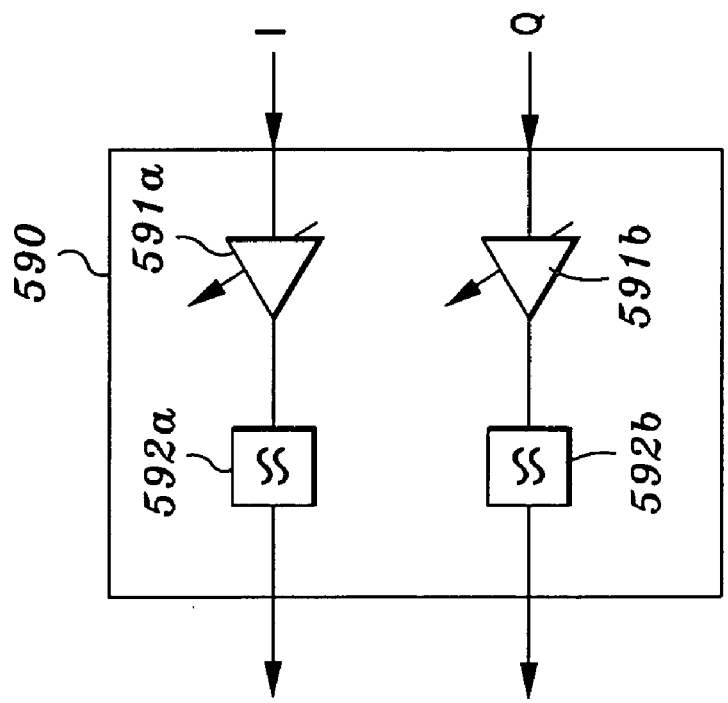
FIG. 12 is a block diagram of a receive baseband module in accordance with one embodiment of the present invention.
Figure 11:
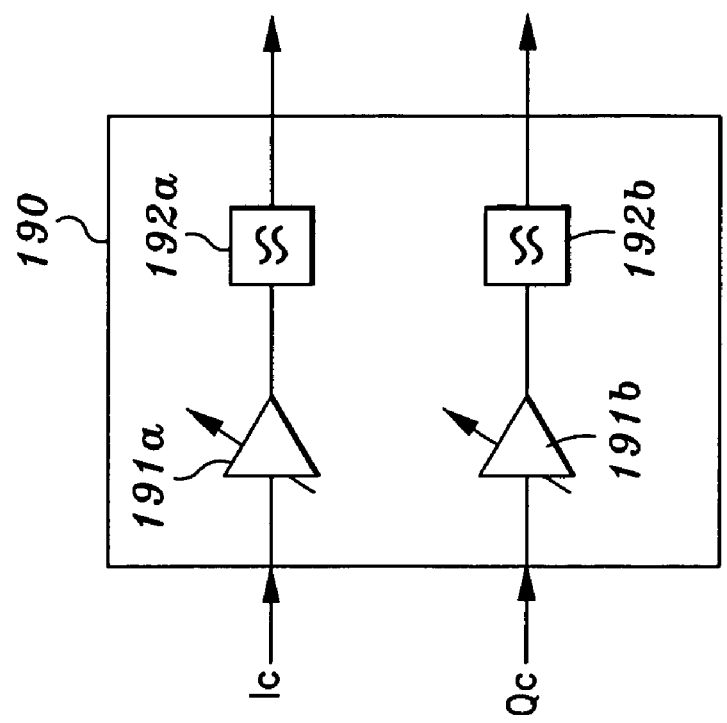
FIG. 11 is a block diagram of a transmit baseband module in accordance with one embodiment of the present invention.

Referring to FIGS. 1, 11 and 12, in accordance with one embodiment of the present invention, the baseband filters (such as filters 192a and 192b in FIG. 11 and filters 592a and 592b in FIG. 12) in both the TX and RX baseband modules 1050, 1150 and 1250 are tuned to ensure that the needed amount of attenuation is provided to reject out-of-band signals or transmitter spurious. The RF transceiver system 1010 provides for the tuning of these baseband filters in approximately 12 percent step sizes. No measurement of the filter nominal bandwidth is necessary to perform this calibration. There is an on-chip ring oscillator, the frequency of which is determined by the same type of capacitors and resistors as are used in the baseband filters. The RF transceiver system 1010 has a filter calibration mode, which counts the frequency of this ring oscillator and stores the result in an SPI register. A baseband device can read this register and then decide how to set the filter bandwidth.

According to one aspect, the filter bandwidths are set up to be the same using the same SPI register. Sixteen steps are provided to cover the range from about 1.23 MHz to 6.5 MHz. Based on the measurement of the ring oscillator frequency, the baseband device can decide which of the sixteen settings corresponds to the desired filter bandwidth. In accordance with one aspect of the present invention, Table 1 below lists the nominal filter bandwidths corresponding to the 4-bit filter bandwidth setting.

TABLE 1

| Setting | Filter Bandwidth (MHz) |
| --- | --- |
| 0 | 1.23 |
| 1 | 1.37 |
| 2 | 1.54 |
| 3 | 1.72 |
| 4 | 1.93 |
| 5 | 2.16 |
| 6 | 2.42 |
| 7 | 2.71 |
| 8 | 3.03 |
| 9 | 3.40 |
| 10 | 3.80 |
| 11 | 4.26 |
| 12 | 4.77 |
| 13 | 5.35 |
| 14 | 5.99 |
| 15 | 6.71 |

Referring to Table 1, as an example, if the frequency count is without error, the nominal settings, which are settings 4, 7, 10 and 13, are used for the standard bandwidths of 1.75, 2.5, 3.5, and 5 MHz. If the frequency count is high by 10 percent, the settings 3, 6, 9, and 12 are used. The setting should be chosen to give the lowest cutoff frequency possible, which is equal to or greater than the channel bandwidth. This scheme provides the most flexibility in optimizing the filter bandwidth for maximum rejection in the stopband.

General Calibration Procedure

According to one aspect of the present invention, the calibration of the RF transceiver system 1010 of FIG. 1 is performed in a particular sequence. The RF transceiver system 1010 includes one TX channel (e.g., from TX I and TX Q to the TX channel frequency converter 1040) and two RX channels (e.g., from the MUX 1160 to RX_A I and RX_A Q and from the MUX 1260 to RX_B I and RX_B Q). The two RX channels can be calibrated simultaneously or sequentially.

According to one aspect of the present invention, the following general calibration sequence is utilized:

Baseband module (e.g., modules 1050, 1150 and 1250) filter calibration;

TX DC offset;

TX gain and/phase balance (sometimes referred to as quadrature balance or IQ balance);

RX DC offset; and

RX gain and/phase balance (sometimes referred to as quadrature balance or IQ balance).

Transceiver System Describing Transmit Calibration

Figure 5:
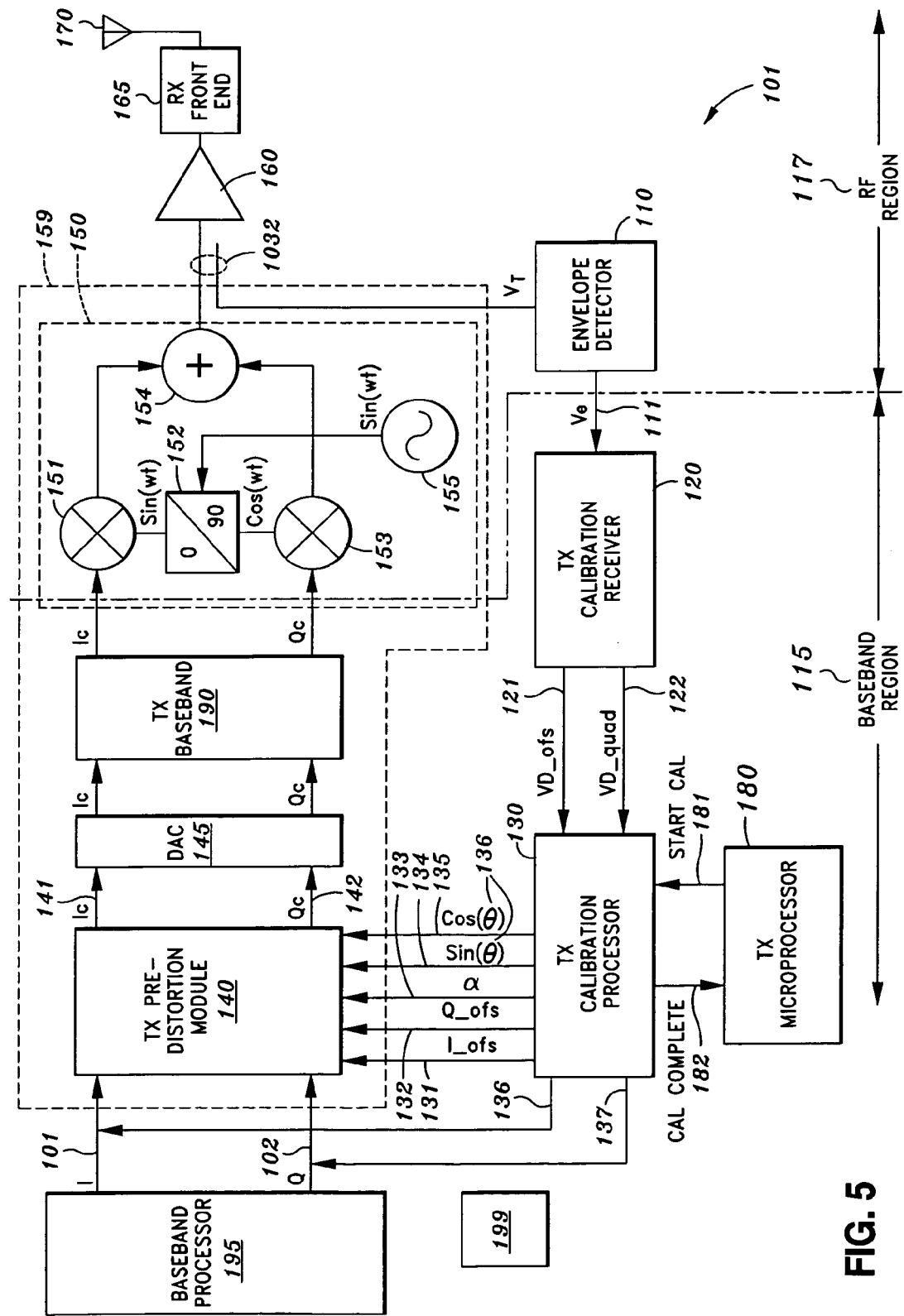
FIG. 5 is a block diagram of a transceiver system in accordance with one embodiment of the present invention.

FIG. 5 is a block diagram of a transceiver system in accordance with one embodiment of the present invention. An RF transceiver system 101 for communication having a transmit channel and a receive channel includes a TX pre-distortion module 140, a digital-to-analog converter (DAC) 145, a TX baseband module 190, a TX channel frequency converter 150, a variable gain amplifier (VGA) 160 and a TX front end 165. An antenna 170 is coupled to the RF transceiver system 101. The RF transceiver system 101 further includes an envelope detector 110, a TX calibration receiver 120, a TX calibration processor 130, a TX microprocessor 180, and a baseband processor 195. A baseband processor 195 may include a bit/data mapper.

An RF region 117 includes devices that operate in RF frequencies (e.g., 100 MHz to 100 GHz, 1 GHz to 10 GHz, 10 GHz to 100 GHz, 2.3 to 2.7 GHz, 3.3 to 3.8 GHz). RF frequencies are not limited to these examples, and RF frequencies may include other ranges. The RF region 117 includes, for example, the TX channel frequency converter 150, the VGA 160, the TX front end 165, the antenna 170 and the envelope detector 110.

A baseband region 115 includes devices that operate in baseband frequencies (e.g., 0 to 100 MHz, 0 to 50 MHz, 0 to 10 MHz, 0 to 5 MHz). Baseband frequencies are not limited to these examples, and baseband frequencies may include other ranges. The baseband region 115 includes, for example, the TX pre-distortion module 140, the DAC 145, the TX baseband module 190, the TX calibration receiver 120, the TX calibration processor 130, the TX microprocessor 180, and the baseband processor 195.

Figure 4A:
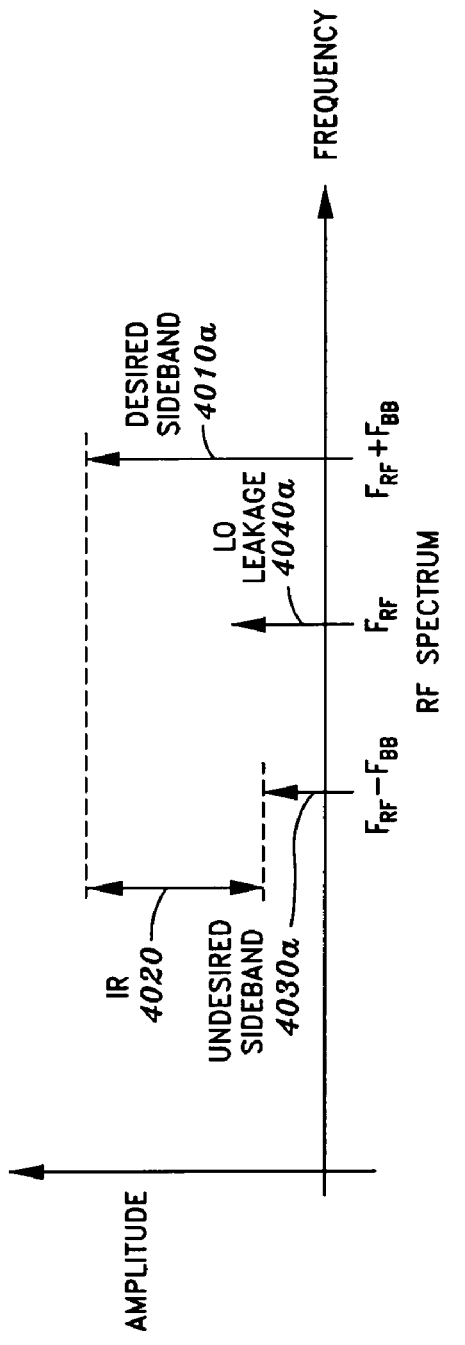
FIG. 4a illustrates another exemplary RF output spectrum in accordance with one embodiment of the present invention.
Figure 4B:
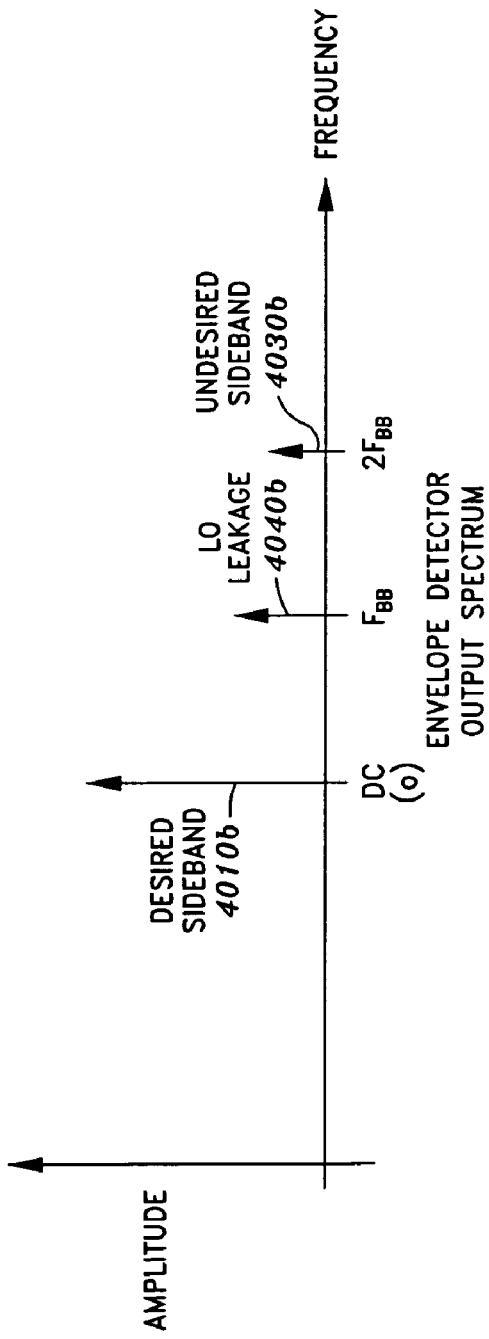
FIG. 4b illustrates another exemplary output of an envelop detector in accordance with one embodiment of the present invention.

During a TX calibration mode (an off-line mode rather than the normal communication operation mode), the envelop detector 110 coupled to the TX channel frequency converter 150 detects the envelope of the transmitted RF signal, $V_T$, from the TX channel frequency converter 150 (e.g., a calibration signal represented by the spectrum shown in FIG. 4(a)) and produces a voltage proportional to the amplitude of the transmitted RF signal, $V_e$ 111 (e.g., a calibration signal represented by the spectrum shown in FIG. 4(b)).

During the TX calibration mode, the TX calibration receiver 120 coupled to the envelope detector 110 samples the output $V_e$ 111 of the envelope detector 110, separates by filtering the signal received from the envelope detector 110 (e.g., the undesired sideband 4040b attributable to DC offset and the undesired sideband 4030b attributable to quadrature error shown in FIG. 4(b)), and produces a calibration error signal VD_ofs 121 attributable to DC offset (which can be viewed as another calibration signal, or a signal based on a calibration signal and attributable to an error caused by DC offset) and a calibration error signal VD_quad 122 attributable to quadrature error (which can be viewed as another calibration signal, or a signal based on a calibration signal and attributable to quadrature error) at the output of the TX calibration receiver 120.

During the TX calibration mode, the TX calibration processor 130 coupled to the TX calibration receiver 120 varies the individual TX calibration adjustment signals such as the error parameters I_ofs 131, Q_ofs 132, α 133 and Θ 136 of sin(Θ) 134 and cos(Θ) 135 while observing the DC offset and quadrature error signals (VD_ofs 121 and VD_quad 122) from the TX calibration receiver 120 to minimize those values (VD_ofs 121 and VD_quad 122).

The error parameters I_ofs 131, Q_ofs 132, α 133 and Θ 136 of sin(Θ) 134 and cos(Θ) 135 are selected in pairs. For example, first vary I_ofs 131 and Q_ofs 132 parameter pair while observing VD_ofs 121 to minimize VD_ofs 121. Then vary α 133 and Θ 136 while observing VD_quad 122 to minimize VD_quad 122.

How I_ofs 131 and Q_ofs 132 are varied (or how to pick the values for I_ofs 131 and Q_ofs 132) is based on the characteristics of the receiver and the particular design and the particular implementation. They are not based on the actual values of the error in a communication signal sent or received during normal operation. The range over which one sweeps the values of I_ofs 131 and Q_ofs 132 is just dependent on all the gains and losses in the particular implementation. They also do not depend on the relative level of the errors produced by the system (i.e., the IR 3020, which is the magnitude difference between the desired sideband 3010a and the undesired sideband 3030a shown in FIG. 3(a)). One can use the gradient estimation approach or the Newton-Raphson approach to find the minimum error for I_ofs 131 and Q_ofs 132.

On can utilize the technique described above for α 133 and Θ 136. The procedure for determining the error parameters α 133 and Θ 136 can be done separately from the procedure done for I_ofs 131 and Q_ofs 132 (e.g., either before or after the procedure for I_ofs 131 and Q_ofs 132). Basically, the procedure for I_ofs 131 and Q_ofs 132 and the procedure for α 133 and Θ 136 can be done one at a time because they are independent. Again, one can use the gradient estimation approach or the Newton-Raphson approach for α 133 and Θ 136.

During a procedure for determining α 133 and Θ 136, α 133 and Θ 136 are varied to minimize VD_quad 122. After Θ 136 is provided to a look-up table 340 in FIG. 7, the look-up table 340 generates sin(Θ) 134 and cos(Θ) 135. α 133 and Θ 136 are varied as one pair for quadrature error minimization (i.e., minimization of VD_quad 122). I_ofs 131 and Q_ofs 132 are varied as one pair for DC offset error minimization (i.e., minimization of VD_ofs 121).

When α 133 and Θ 136 are varied simultaneously as a pair and I_ofs 131 and Q_ofs 132 are varied simultaneously as another pair, each of I_ofs 131, Q_ofs 132, α 133 and Θ 136 can be varied individually and independently. One can also vary all of I_ofs 131, Q_ofs 132, α 133 and Θ 136 simultaneously, or each of them can be varied sequentially. Regardless of whether I_ofs 131, Q_ofs 132, α 133 and Θ 136 are varied sequentially or simultaneously, each of them can be varied individually and independently of another. While it is preferred to calibrate DC offset first and then the gain and/or phase imbalance, the gain and/or phase imbalance may be calibrated before the DC offset calibration.

During the calibration mode, the TX pre-distortion block 140 coupled to the TX calibration processor 130 iteratively applies the values of I_ofs 131, Q_ofs 132, α 133 and Θ 136 to the I and Q calibration signal received from the TX calibration processor 130 at inputs I 101 and Q 102 to compensate for the DC offset errors and the quadrature errors (VD_ofs 121 and VD_quad 122). Once the minimum is found for each of the DC offset errors and the quadrature errors (VD_ofs 121 and VD_quad 122), the final values (or optimum values) of I_ofs 131, Q_ofs 132, α 133 and Θ 136 are frozen at those values where the minimum error is found.

When those final error parameter values (I_ofs 131, Q_ofs 132, α 133 and Θ 136), which have been iteratively evaluated and finalized during the calibration mode, are applied to the TX pre-distortion block 140 coupled to the baseband processor 195 during a normal communication operation mode, those values modify the I and Q communication signals from I 101 and Q 102 of the TX pre-distortion block 140. These I and Q communication signals are supplied by the baseband processor 195 (not the TX calibration processor 130). The TX pre-distortion block 140 produces Ic 141 and Qc 142 at the outputs of the TX pre-distortion block 140 such that the output of the TX channel frequency converter 150 can provide communication signals having minimum DC offset and quadrature errors.

According to one aspect of the present invention, the TX baseband module 190 (coupled to the TX pre-distortion module 140, the DAC 145 and the TX channel frequency converter 150) represents the TX baseband module 1050 in FIG. 1 and is part of a direct conversion transmitter. The TX baseband module 190 contains variable gain amplifiers (VGAs) 191a and 191b and low pass filters 192a and 192b in the I and the Q paths as shown in FIG. 11. The TX baseband module 190 filters out-of-bound signals that one does not desire to transmit and sets the gain appropriately for the desired transmit level.

According to one aspect of the present invention, the TX channel frequency converter 150 represents the TX channel frequency converter 1040 of FIG. 1 and includes mixers 151 and 153, a local oscillator (LO) 155, a 0-90 degree LO splitter 152, and a combiner 154. The TX channel frequency converter 150 takes the I and Q signals outputted by the TX baseband module 190, mix them with a LO signal from the LO 155 to produce a composite RF signal of the desired transmitted frequency at the node 1032.

The TX microprocessor 180 coupled to the TX calibration processor 130 controls the calibration process. It starts the calibration mode by instructing the TX calibration processor 130 to begin the sequence of operations to find the minimum, and when the calibration is complete, the TX microprocessor 180 signals that the calibration process is complete so that transceiver system 101 can exit out of the calibration mode. The TX microprocessor 180 uses a start cal signal 181 to start the calibration.

According to one embodiment of the present invention, the baseband device described with reference to FIG. 1 can include any one or more or all of the baseband devices, such as the baseband processor 195, the TX pre-distortion module 140, the DAC 145, the TX calibration receiver 120, the TX calibration processor 130 and the TX microprocessor 180. The baseband device may include other additional devices, blocks and/or modules.

Transmit Calibration Receiver

Figure 6:
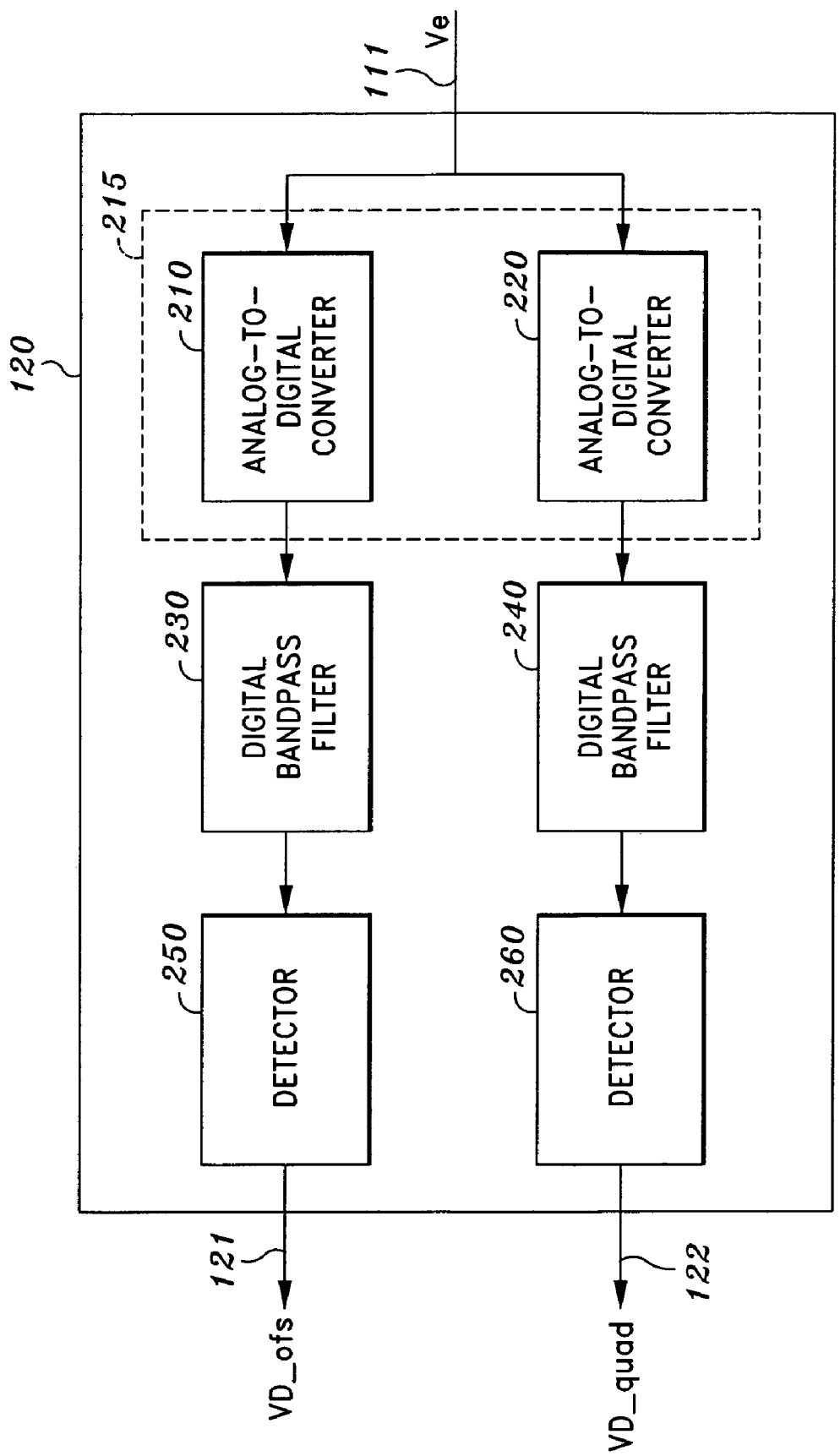
FIG. 6 is a block diagram of a transmit calibration receiver in accordance with one embodiment of the present invention.

FIG. 6 is a block diagram of a transmit calibration receiver in accordance with one embodiment of the present invention. The TX calibration receiver 120 includes analog-to-digital converters (ADCs) 210 and 220, digital bandpass filters 230 and 240, and detectors 250 and 260. In another embodiment, the two ADC 210 and 220 may be replaced by one ADC.

The ADCs 210 and 220 coupled to the envelop detector 110 of FIG. 1 convert the analog signal $V_e$ 111 derived from the calibration signal into digital signals. The digital bandpass filters 230 and 240 coupled to the ADCs 210 and 220 separate or filter out the component of $V_e$ 111 attributable to the DC offset (VD_ofs 121) and the component of $V_e$ 111 attributable to quadrature error (VD_quad 122) from $V_e$ 111.

The detectors 250 and 260 coupled to the digital bandpass filters 230 and 240 detect the amplitude of the component of $V_e$ 111 attributable to the DC offset (VD_ofs 121) and the component of $V_e$ 111 attributable to quadrature error (VD_quad 122) and produces VD_ofs 121 and VD_quad 122 as outputs.

Transmit Calibration Processor

Figure 7:
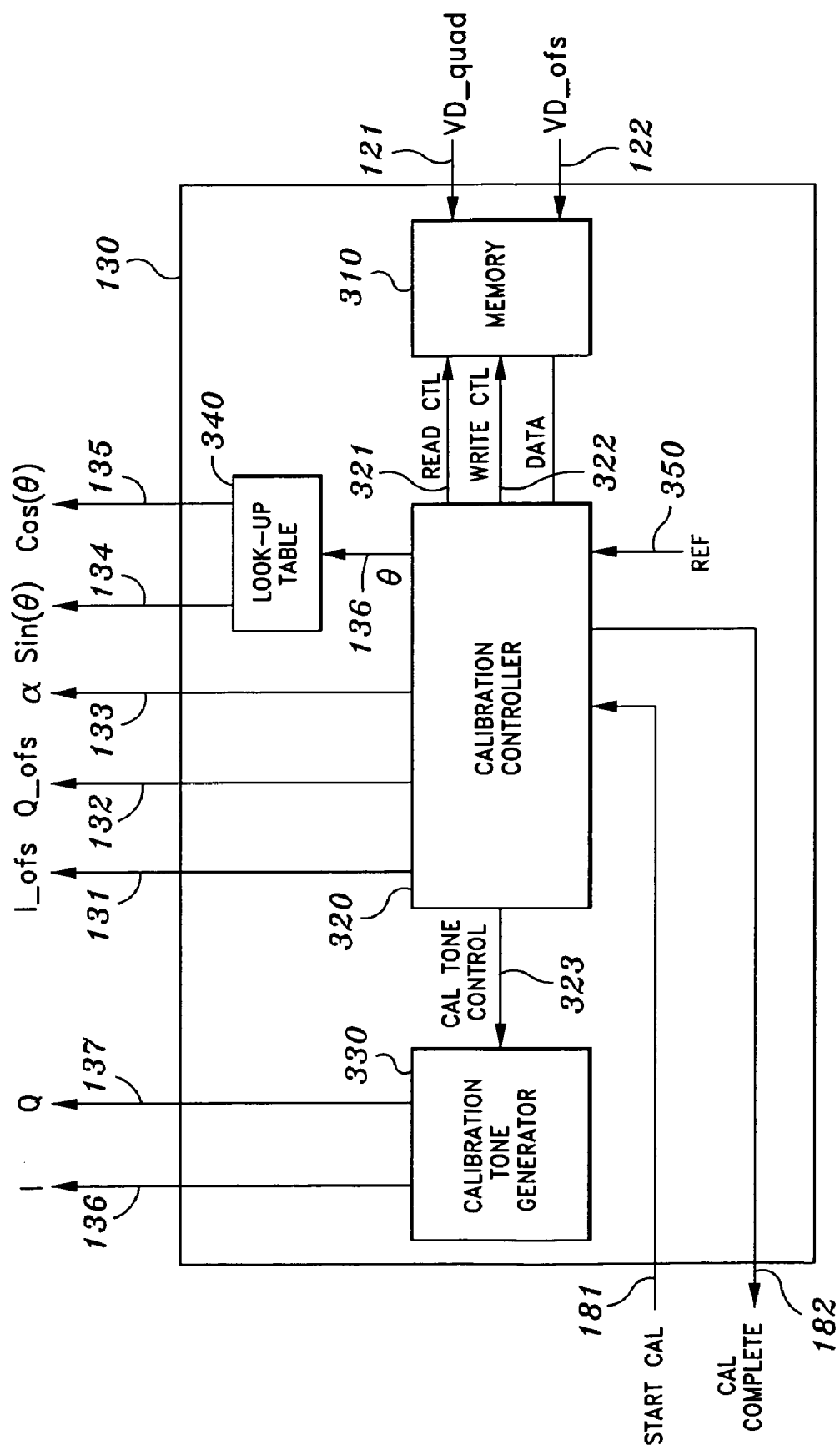
FIG. 7 is a block diagram of a transmit calibration processor in accordance with one embodiment of the present invention.

FIG. 7 is a block diagram of a transmit calibration processor in accordance with one embodiment of the present invention. The TX calibration processor 130 includes a memory 310, a calibration controller 320 coupled to the memory 310, a calibration tone generator 330 coupled to the calibration controller 320, and a look-up table 340 coupled to the calibration controller 320.

The memory 310 stores the values of VD_ofs 121 and VD_quad 122. As the error parameters I offset (I_ofs 131), Q offset (Q_ofs 132), α 133 and Θ 136 are iteratively varied, minimum VD_ofs 121 and VD_quad 122 can be found. Once the minimum VD_ofs 121 and VD_quad 122 are determined, the final values of I offset (I_ofs 131), Q offset (Q_ofs 132), α 133 and Θ 136 that produced the minimum VD_ofs 121 and VD_quad 122 are stored so that they can be used during the normal communication operation mode. The intermediate values of I_ofs 131, Q_ofs 132, α 133 and Θ 136 supplied during the iterative process of determining minimum VD_ofs 121 and VD_quad 122 can be stored in the memory 310 but do not need to be stored in memory. These intermediate values can be calculated using algorithm. In the case of sin(Θ) 134 and cos(Θ) 135, they are produced from the look-up table 340 based on the value of Θ 136 that goes into the look-up table 340. The look-up table 340 produces sin(Θ) 134 and cos(Θ) 135 based on Θ 136. In the case of I_ofs 131 and Q_ofs 132, these can be either stored in a memory or be calculated using an algorithm.

The calibration controller 320 (in conjunction with the look-up table 340) produces and sweeps the values of the error parameters I_ofs 131, Q_ofs 132, α 133 and Θ 136. For each value it produces for the error parameters I_ofs 131, Q_ofs 132, α 133 and Θ 136, it stores the values of VD_ofs 121 and VD_quad 122. The calibration controller 320 searches for the value of each of VD_ofs 121 and VD_quad 122 that is below its respective threshold that is considered a minimum. The threshold values are provided by the reference Ref 350. As soon as it finds that values in the memory 310, VD_ofs 121 and VD_quad 122 are considered to have been minimized, and the memory 310 stores the values of the error parameters I_ofs 131, Q_ofs 132, α 133 and Θ 136 corresponding to the minimum VD_ofs 121 and VD_quad 122. Once the calibration is completed, these values of the error parameters I_ofs 131, Q_ofs 132, α 133 and Θ 136 corresponding to the minimum VD_ofs 121 and VD_quad 122 will be used for normal operation.

The calibration controller 310 provides a read control signal 321 and a write control signal 322 to the memory 310 and a calibration tone control signal 323 to the calibration tone generator 330. The TX calibration controller 310 also provides the calibration complete signal 182 to the TX microprocessor 180.

During a TX calibration mode, the calibration tone generator 330 produces a calibration signal such as the I and Q sinusoidal calibration signals 136 and 137 that are applied to the TX pre-distortion module 140.

Transmit Pre-Distortion Module

Figure 8:
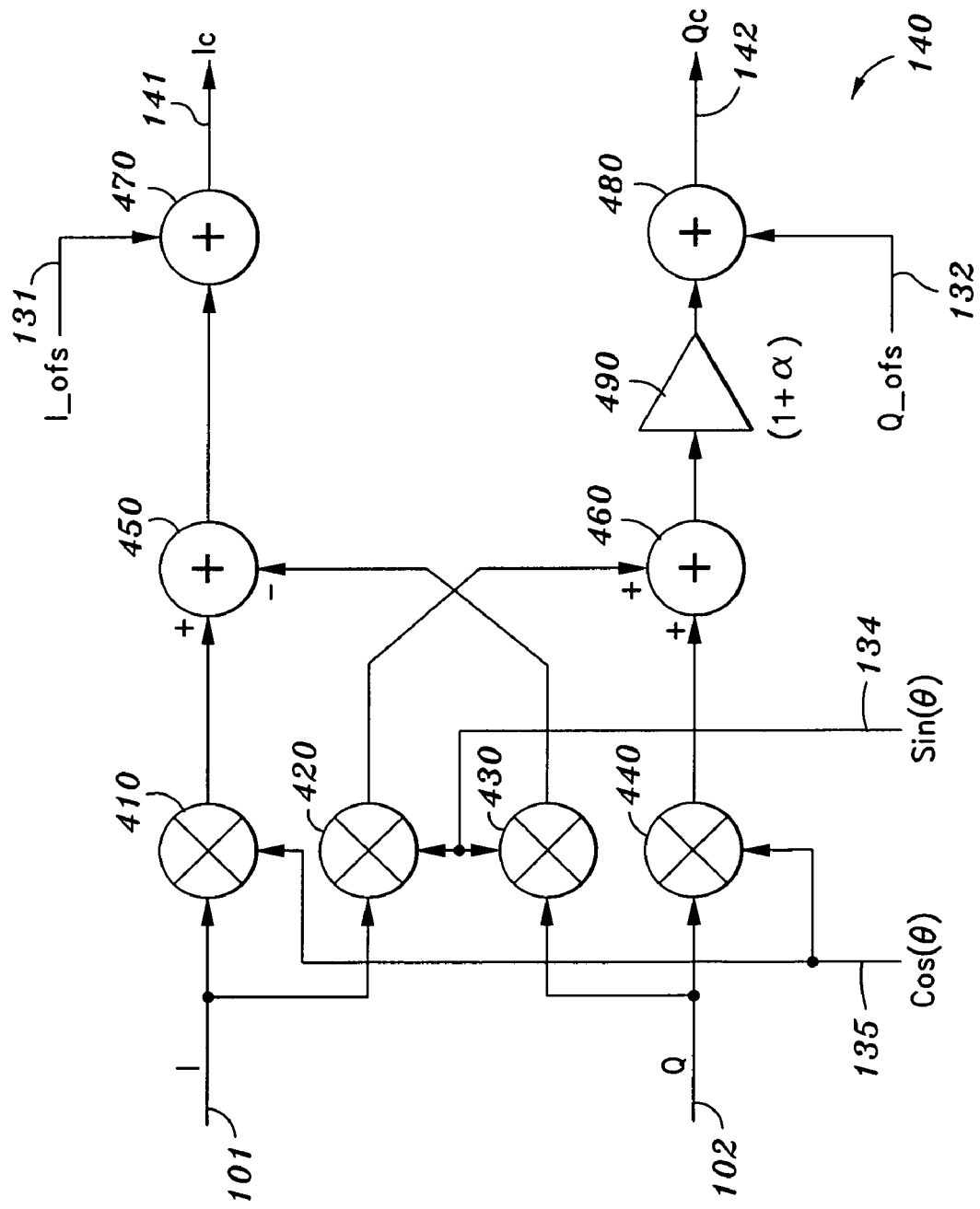
FIG. 8 is a block diagram of a transmit pre-distortion module in accordance with one embodiment of the present invention.

FIG. 8 is a block diagram of a transmit pre-distortion module in accordance with one embodiment of the present invention. The TX pre-distortion module 140 includes multipliers 410, 420, 430 and 440, adders 450, 460, 470 and 480 and a gain block 490.

The multipliers 410, 420, 430 and 440 and adders 450 and 460 together form a complex multiplication. The complex number defined by 1101 and Q 102 is multiplied by another complex number defined by sin(Θ) 134 and cos(Θ) 135. So the multipliers 410, 420, 430 and 440 and adders 450 and 460 form a multiplier in the complex domain. The output is another complex number defined by Ic 141 and Qc 142.

The gain block 490 produces a gain offset or a gain imbalance. α is the parameter that is varied to change the gain imbalance between the I and Q signals. If α grows bigger, then there is more gain in the Q path than in the I path. If α is negative, gain is subtracted from the Q path and if α is positive, gain is added to the Q path to compensate for the gain imbalance in the system.

The adder 470 adds a DC offset calibration adjustment signal for I (I_ofs 131) to the I path, and the adder 480 adds a DC offset calibration adjustment signal for Q (Q_ofs 132) to the Q path to compensate for the system's DC offsets in the I and Q paths.

Transceiver System Describing Receive Calibration

Figure 9:
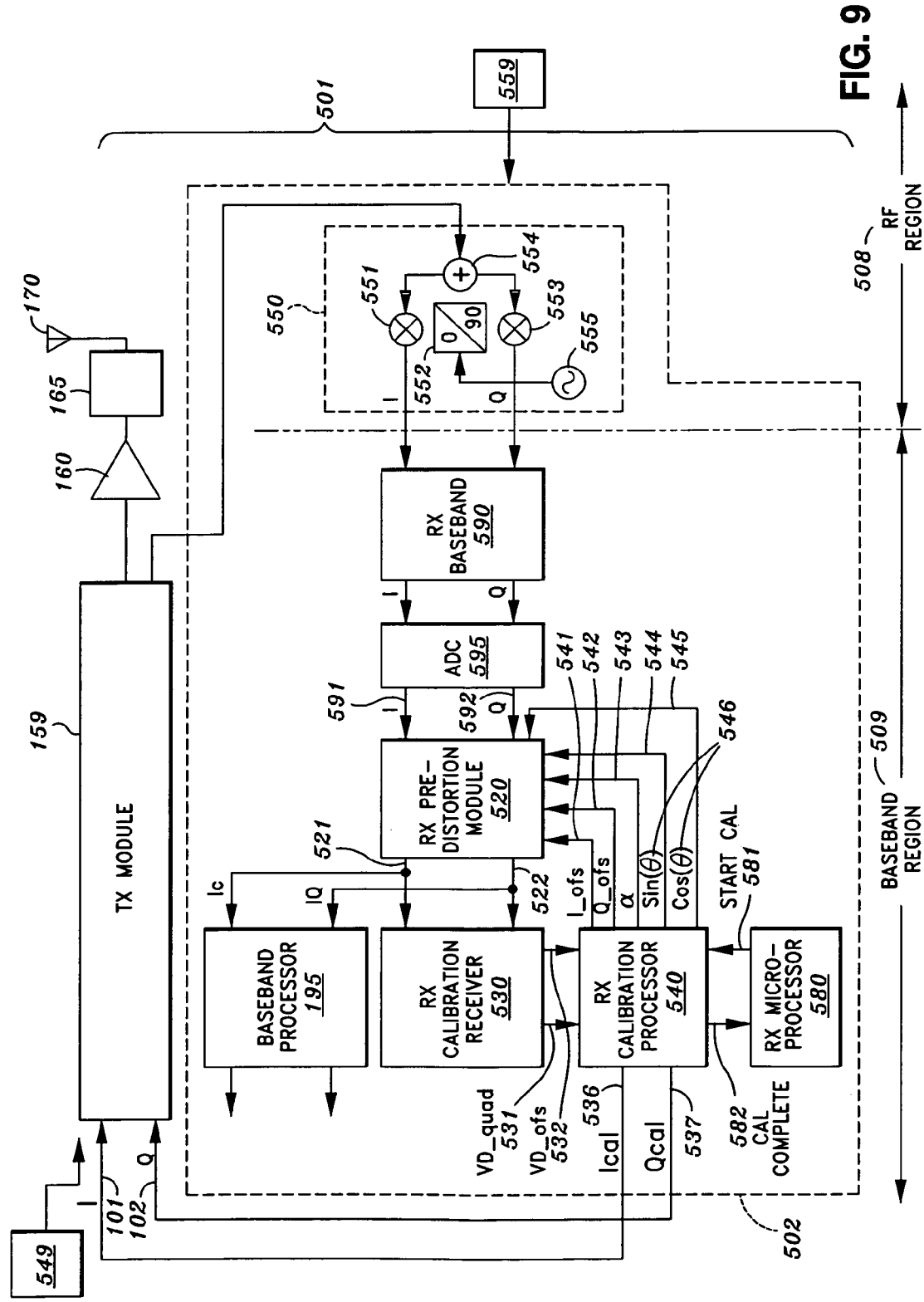
FIG. 9 is a block diagram of a transceiver system in accordance with one embodiment of the present invention.

FIG. 9 is a block diagram of a transceiver system in accordance with one embodiment of the present invention. A transceiver system 501 includes a TX module 159, an RX module 502, the VGA 160 and the TX front end 165. The TX module 159 includes the TX pre-distortion module 140, the DAC 145, the TX baseband module 190, and the TX channel frequency converter 150 in FIG. 5.

The RX module 502 includes an RX channel frequency converter 550 coupled to the TX channel frequency converter 150 of the TX module 159, an RX baseband module 590 coupled to the RX channel frequency converter 550, an ADC 595 coupled to the RX baseband module 590, an RX pre-distortion module 520 coupled to the ADC 595, an RX calibration receiver 530 coupled to the RX pre-distortion module 520, an RX calibration processor 540 coupled to the RX calibration receiver 530 and the RX pre-distortion module 520, an RX microprocessor 580 coupled to the RX calibration processor 540, and a baseband processor 195 coupled to the RX pre-distortion module 520.

An RF region 508 includes devices that operate in RF frequencies. The RF region 508 includes, for example, the RX channel frequency converter 550. A baseband region 509 includes devices that operate in baseband frequencies. The baseband region 509 includes, for example, the RX baseband module 590, the ADC 595, the RX pre-distortion module 520, the RX calibration receiver 530, the RX calibration processor 540, the RX microprocessor 580 and the baseband processor 195.

The RX channel frequency converter 550 is a downconverter for a direct conversion receiver. The RX channel frequency converter 550 includes two mixers 551 and 553, an LO 555, a 0-90 degree LO splitter 552, and a power divider 554.

The RX baseband module 590 is a part of the direct conversion receiver. As shown in FIG. 12, the RX baseband module 590 includes VGAs 591a and 591b for I and Q paths and low pass filters 592a and 592b in the I and Q paths to filter out out-of-band interfering signals. The ADC 595 converts an analog signal into a digital signal.

The RX pre-distortion module 520 includes components and connections shown in FIG. 8. When the components in FIG. 8 are implemented as the components of the RX pre-distortion module 520, the nodes 101 and 102 in FIG. 8 correspond to nodes 591 and 592 in FIG. 9, the nodes 141 and 142 in FIG. 8 correspond to nodes 521 and 522 in FIG. 9, and I_ofs 131, Q_ofs 1322, Θ of sin(Θ) 134 and cos(Θ) 135 in FIG. 8 correspond to I_ofs 541, Q_ofs 542, sin(Θ) 544 and cos(Θ) 545 of FIG. 9.

The RX pre-distortion module 520 performs the same functions as TX pre-distortion module 140 in FIG. 5, except in the receive direction. During an off-line calibration mode, the RX pre-distortion module 520 receives a calibration signal composed of I and Q from the ADC 595 and receives iteratively error parameters of I_ofs 541, Q_ofs 542, α 543 and Θ of sin(Θ) 544 and cos(Θ) 545 from the RX calibration processor 540 until the final error parameters are determined. During a normal communication operation mode, the RX pre-distortion module 520 receive a communication signal from the ADC 595 and the final error parameters (or optimum error parameters) of I_ofs 541, Q_ofs 542, α 543 and Θ of sin(Θ) 544 and cos(Θ), which have been determined during the off-line calibration mode, to adjust the communication signal for the DC offset and/or gain and/or phase imbalance.

The RX calibration receiver 530 performs substantially the same functions as the TX calibration receiver 120. The difference is that the I and Q signals need to processed as complex numbers.

The RX calibration processor 540 performs substantially the same functions as and includes substantially the same elements as the TX calibration processor 130. The components and structures shown in FIG. 7 may be implemented as the components and structures of the RX calibration processor 540, except that the notations 136, 137, 131, 132, 133, 134, 135, 136, 121, 122, 181 and 182 are replaced by the notations 536, 537, 541, 542, 543, 544, 545, 546, 531, 532, 581 and 582.

The TX microprocessor 580 performs substantially the same functions as and includes substantially the same elements as the TX microprocessor 180.

Receive Calibration Receiver

Figure 10:
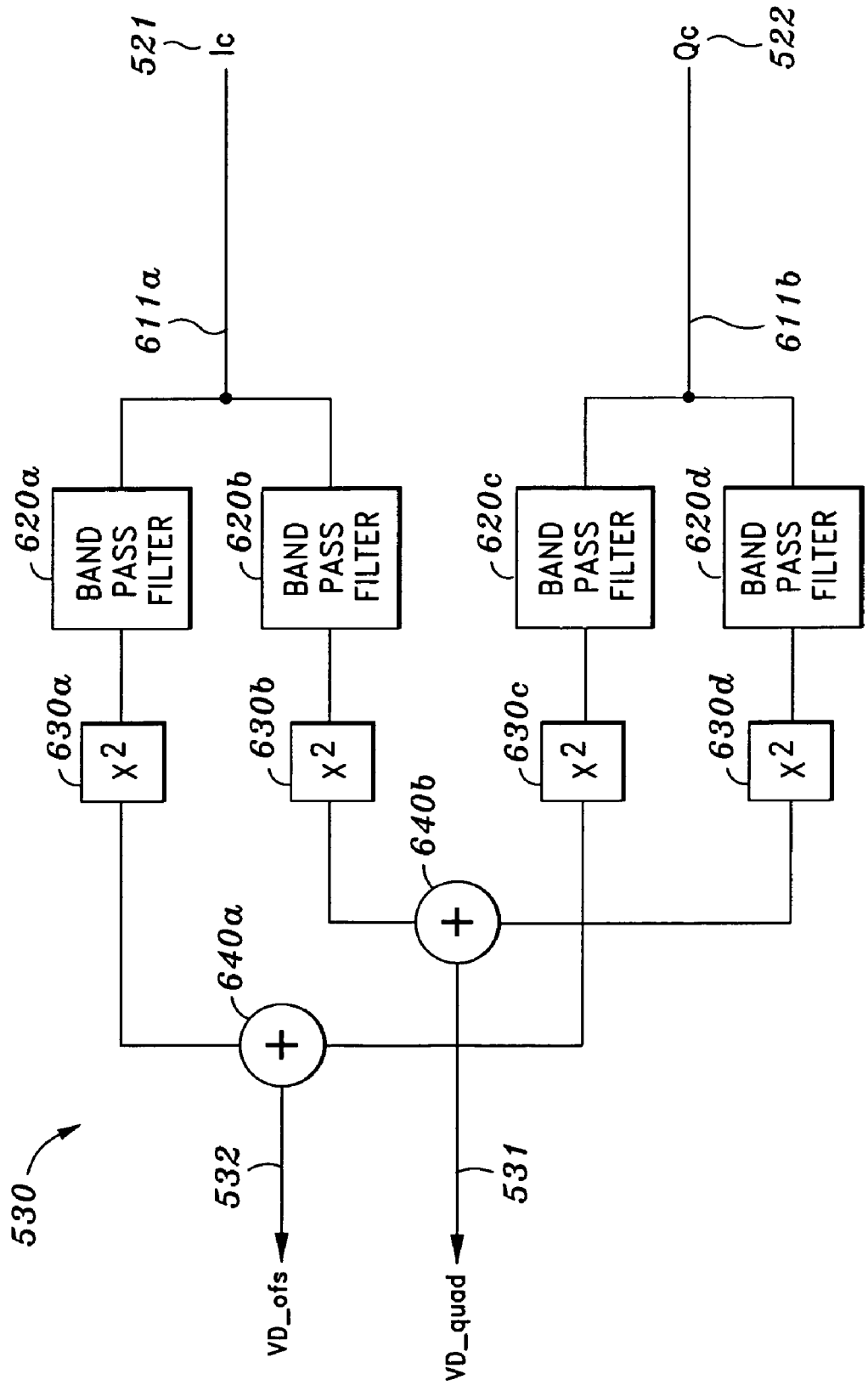
FIG. 10 is a block diagram of a receive calibration receiver in accordance with one embodiment of the present invention.

FIG. 10 is a block diagram of a receive calibration receiver in accordance with one embodiment of the present invention. The RX calibration receiver 530 includes bandpass filters 620a, 620b, 620c and 620d, square-law blocks 630a, 630b, 630c and 630d, and adders 640a and 640b.

The bandpass filters 620a, 620b, 620c and 620d perform substantially the same functions as the two bandpass filters 230 and 240 in FIG. 6 for the transmitter section, except that the bandpass filters 620a, 620b, 620c and 620d are for the receiver section, and there are two filters for each of the I and Q paths because the signals are complex I and Q signals instead of a single real signal as in the transmitter section. I and Q each needs to be separately band pass filtered.

The output of each of the bandpass filters 620a, 620b, 620c and 620d passes through the square-law block 630a, 630b, 630c and 630d, respectively. The outputs of the square-law blocks are summed at the adders 640a and 640b to form I-squared and Q-squared signals to produce VD_ofs 532 and VD_quad 531. The pair of bandpass filters 620a and 620c are tuned or centered to a frequency to filter the error signal for VD_ofs 532, and the pair of bandpass filters 620b and 620d are tuned to the other frequency that is representative of the quadrature error to produce VD_quad 531.

The baseband subsystem or device referenced with respect to FIG. 1 may include any one or more all of the ADC 595, the RX pre-distortion module 520, the RX calibration receiver 530, the RX calibration processor 540, the RX microprocessor 580, and the baseband processor 195 in FIG.

9. The baseband device may include additional items. In one embodiment, the RX calibration receiver 530 is within the baseband processor 195. In yet another embodiment, the baseband processor 195 may include any one or more or all of the RX pre-distortion module 520, the ADC 595, the RX calibration receiver 530, the RX calibration processor 540 and the RX microprocessor 580.

According to one embodiment of the present invention, the RX baseband module 590 in FIG. 9 may represent the RX baseband module 1150 or 1250 in FIG. 1. The RX channel frequency converter 550 may represent the RX channel frequency converter 1140 or 1240 in FIG. 1. The devices such as the RX channel frequency converter 550 and the RX baseband module 590 may be coupled to the components in an RX channel (e.g., the MUX 1160, the LNA 1130, the RX front end 1120, and the antenna 1115 in FIG. 1) and another copy of the RX channel frequency converter 550 and the RX baseband module 590 may be coupled to the components in the second RX channel (e.g., the MUX 1260, the LNA 1230, the RX front end 1220, and the antenna 1215 in FIG. 1).

Off-Line TX and RX Calibration Modes and Normal Communication Mode

According to one aspect, the present invention relates to apparatus and methods for off-line calibration of DC offset and quadrature imbalance in a direct conversion transceiver. The calibration is performed by adjusting the calibration adjustment parameters during an off-line calibration mode to minimize the errors generated in a calibration signal. Referring to FIGS. 1, 4(b), 5, 7 and 9, TX and RX calibration modes and normal TX and RX communication modes are described below according to one aspect of the present invention.

Off-Line TX Calibration Mode

According to one aspect of the present invention, to initiate a TX calibration process, an off-line TX calibration mode is enabled and the normal TX communication operation mode is disabled. Referring to FIG. 5, during an off-line TX calibration mode, the TX pre-distortion module 140, the DAC 145, the TX baseband module 190, the TX channel frequency converter 150, the envelope detector 110, the TX calibration receiver, the TX calibration processor 130, and the TX microprocessor 180 are utilized.

Referring to FIGS. 4(b), 5 and 7, during a TX calibration mode, a calibration tone generator 330 in FIG. 7 generates a calibration signal (e.g., a tone in the form of sine and cosine waves). This calibration signal is applied to the I and Q inputs 101 and 102 of the transceiver system 101. The resulting output $V_e$ 111 of the envelope detector 110 contains two sinusoidal waves at two different frequencies (e.g., $2F_{BB}$ and $F_{BB}$ as shown in FIG. 4(b)). The amplitude of the higher frequency sinusoidal wave (e.g., undesired sideband 4030b at $2F_{BB}$) is proportional to the gain and/or phase imbalance (or quadrature error). The amplitude of the lower frequency sinusoidal wave (e.g., undesired sideband 4040b at $F_{BB}$) is proportional to the DC offset and is a result of DC offset contained in Ic and/or Qc, or $V_T$.

During a TX calibration mode, the gain and phase imbalance of the transmitter (including, for example, the gain and phase imbalance in the TX pre-distortion module 140, the DAC 145, the TX baseband 190 and the TX channel frequency converter 150) are independently varied to minimize the amplitude of the higher frequency sinusoidal wave at the output of the envelope detector 110. The effect of gain and phase imbalance on the amplitude of the sinusoidal wave (e.g., undesired sideband 4030b at $2F_{BB}$) are independent of each other, so the search for the minimum can be conducted by varying each of these parameters independently.

The DC offset is a result of DC offset on either the I or Q input or both. The I and Q DC offsets have independent effect on the amplitude of the lower frequency sinusoidal wave (e.g., undesired sideband 4040b at $F_{BB}$) at the output of the envelope detector 110. Like the gain and phase imbalance, each of the I and Q DC offsets can be adjusted independently to minimize the amplitude of the lower frequency sinusoidal wave. When the two sinusoidal wave components of the envelope detector output are minimized, the quadrature and DC offset errors in the transmitter are minimized.

To calibrate the transmitter, the microprocessor 180 puts the transmitter in a calibration mode in which normal transmissions are halted and calibration signals, Ical and Qcal from the calibration tone generator 330 of FIG. 7 are applied to the I and Q inputs 101 and 102 of the TX pre-distortion module 140. The DAC 145 converts the I and Q calibration signal from digital form into analog form. The TX baseband module 190 filters out the out-of-bound signals from the I and Q calibration signal and applies the filtered calibration signal to the TX channel frequency converter 150. The output of the TX channel frequency converter 150, $V_T$ (upconverted I and Q calibration signal), is coupled to the input of the envelope detector 110. If there are quadrature errors in the I and Q calibration signal, the output of the envelope detector 110, $V_e$ 111, will contain a sinusoidal wave at a frequency twice (e.g., $2F_{BB}$) that of the calibration signal. If there are DC offset errors, $V_e$ 111 will contain a sinusoidal wave equal in frequency (e.g., $F_{BB}$) to that of the calibration signal.

$V_e$ 111 is applied to the input of the TX calibration receiver 120, which is able to separate the two sinusoidal waves in $V_e$. The output of the TX calibration receiver 120 includes two signals, VD_ofs 121 and VD_quad 122. These are DC voltages or digital representation of DC voltages, which are proportional to the DC offset and quadrature errors, respectively. These signals are passed to the TX calibration processor 130. The calibration processor 130 stores the values of VD_ofs 121 and VD_quad 122 as the processor 130 varies the associated parameters that are fed to the TX pre-distortion module 140. The TX calibration processor 130 varies the phase imbalance by adjusting Θ 136 of the sin(Θ) 134 and cos(Θ) 135 outputs. The gain imbalance is independently varied by adjusting the α 133 output.

The I and Q DC offsets are varied by adjusting the I_ofs 131 and Q_ofs 132 outputs. As each of these parameters are varied, the TX calibration processor 130 compares the level of the associated calibration error signal, VD_quad 121 or VD_offset 122, with its respective threshold provided by Ref 350 in FIG. 7. I_ofs 131 and Q_ofs 132 are associated with VD_offset 122. α 133 and Θ (or sin(Θ) 134 and cos(Θ) 135) are associated with VD_quad 121. The thresholds provided by Ref 350 represent the acceptable minimum values for error. When each of the error signal amplitudes of VD_quad 121 and VD_offset 122 falls below its respective threshold of Ref 350, the transmitter is considered to be calibrated, and the TX microprocessor 180 is informed of the completion of the calibration through the calibration complete signal 182.

TX Communication Operation Mode

Referring to FIG. 5, during a normal TX communication operation mode, the baseband processor 195, the TX pre-distortion module 140, the DAC 145, the TX baseband module 190, the TX channel frequency converter 150, the VGA 160, the TX front end 165, and the antenna 170, all of which create a TX channel, are utilized according to one aspect of the present invention. The TX calibration processor 130 is utilized to apply the final or optimum error parameters (e.g., I_ofs 131, Q_ofs 132, α 133, sin(Θ) 134 and cos(Θ) 135) determined during the TX calibration mode to the TX pre-distortion module 140.

Referring to the block diagram in FIG. 5, according to one aspect of the present invention, during the normal TX communication operation, I and Q baseband communication signals from the baseband processor 195 or other source (e.g., block 199) are applied at the I and Q inputs 101 and 102 of the transmitter. These communication signals go through the TX pre-distortion module 140 which adjusts the signals for any gain and phase imbalance and any I and Q DC offsets using the final or optimum error parameters (I_ofs 131, Q_ofs 132, α 133 and Θ 136 of sin(Θ) 134 and cos(Θ) 135) determined during the off-line TX calibration mode.

The output of the TX pre-distortion module 140 is corrected I and Q signals 141 and 142 after calibration. These signals are coupled to the I and Q inputs of the TX channel frequency converter (a quadrature upconverter) 150, which upconverts and combines the corrected I and Q baseband communication signals. The output of the mixers 151 and 153 is an RF transmission signal, which is amplified by a power amplifier (PA) and radiated from the antenna 170.

While the final or optimum error parameters are used during the normal TX communication operation mode to compensate for the errors in the system, the error parameters are not calculated, evaluated or determined during the TX communication operation mode. The error parameters are determined during a TX calibration mode.

Off-Line RX Calibration Mode

According to one aspect of the present invention, to initiate an RX calibration process, an off-line RX calibration mode is enabled and the normal RX communication operation mode is disabled. Referring to FIG. 9, during an off-line RX calibration mode, the TX module 159, the RX channel frequency converter 550, the RX baseband module 590, the ADC 595, the RX pre-distortion module 520, the RX calibration receiver 530, the RX calibration processor 540, and the RX microprocessor 580 are utilized according to one aspect of the present invention. The TX module 159 is used as a source for the RX calibration.

Referring to FIGS. 7 and 9, during an RX calibration mode, a calibration tone generator (such as the generator 330 in FIG. 7) implemented in the RX calibration processor 540 generates a calibration signal (e.g., a tone in the form of sine and cosine waves). This calibration signal is applied from the RX calibration processor 540 to the I and Q inputs 101 and 102 of the TX module 159. The output of the TX module 159 is a corrected, upconverted calibration signal. This is applied to the input of the RX channel frequency converter 550.

Because the TX module 159 has been calibrated during the TX calibration mode described above, when the calibration signal from the RX calibration processor 530 is applied to the TX module 159, the calibration signal is adjusted by the final or optimum error parameters (I_ofs 131, Q_ofs 132, α 133 and Θ 136 of sin(Θ) 134 and cos(Θ) 135), and the calibration signal applied to the RX channel frequency converter 550 from the TX module 159 is considered to be free of error.

During the RX calibration mode, the gain and phase imbalances of the receiver (including, for example, the gain and phase imbalance of the RX channel frequency converter 550, the RX baseband module 590, the ADC 595, the RX pre-distortion module 520) are independently varied to minimize the amplitude of the VD_quad 531. The effect of each of the gain and phase imbalances (e.g., α 543 and Θ 546) on the amplitude of the VD_quad 531 is independent of each other, so the search for the minimum can be conducted by varying each of these error parameters (e.g., α 543 and Θ 546) independently.

The DC offset is a result of DC offset on either the I or Q input. The I and Q DC offsets (e.g., I_ofs 541 and Q_ofs 542) have independent effect on the amplitude of the VD_ofs 532. Like the gain and phase imbalance, each of the I and Q DC offsets can be adjusted independently to minimize the amplitude of the VD_ofs 532. When VD_quad 531 and VD_ofs 532 are minimized, the quadrature and DC offset errors in the receiver are minimized.

To calibrate the receiver, the RX microprocessor 580 puts the receiver in a calibration mode in which normal transmissions are halted and calibration signals, Ical and Qcal, from the calibration tone generator (such as the generator 330 of FIG. 7) of the RX calibration processor 540 are applied to the I and Q inputs 101 and 102 of the TX module 159. The TX module 159 produces an upconverted calibration signal that is substantially free of error.

The upconverted-calibrated signal from the TX module 159 is applied to the RX channel frequency converter 550, which down converts the calibrated signal and separates it into I and Q calibration signals. The RX baseband module 590 filters out the out-of-bound signals from the I and Q calibration signals and applies the filtered calibration signals to the ADC 595, which transforms the analog calibration signals into digital calibration signals. The digital I and Q calibration signals are applied to the RX pre-distortion module 520.

The I and Q calibration signals from the RX pre-distortion module 520 are applied to the RX calibration receiver 530, which separates out (or filters) the VD_ofs 532 and VD_quad 531 from the I and Q calibration signals. These are DC voltages or digital representation of DC voltages, which are proportional to the DC offset and quadrature errors, respectively. These signals are passed to the RX calibration processor 540. The calibration processor 540 stores the values of VD_ofs 532 and VD_quad 531 as the processor 540 varies the associated parameters that are fed to the RX pre-distortion module 520. The RX calibration processor 540 varies the phase imbalance by adjusting Θ 546 or the sin(Θ) 544 and cos(Θ) 545 outputs. The gain imbalance is independently varied by adjusting the α 543 output.

The I and Q DC offsets are varied by adjusting the I_ofs 541 and Q_ofs 542 outputs. As each of these parameters is varied, the RX calibration processor 540 compares the level of the associated calibration error signal, VD_quad 531 or VD_offset 532, with its corresponding threshold (such as the thresholds provided by Ref 350 in FIG. 7). I_ofs 541 and Q_ofs 542 are associated with VD_offset 532. α 542 and Θ 546 or (sin(Θ) 544 and cos(Θ) 545) are associated with VD_quad 531. The thresholds provided by Ref 350 represent the acceptable minimum values for error. When each of the error signal amplitudes of VD_quad 531 and VD_offset 532 falls below its respective threshold provided by Ref 350, the receiver is considered to be calibrated, and the RX microprocessor 580 is informed of the calibration completion through the calibration complete signal 582.

While it is preferred to calibrate DC offset first and then the gain and/or phase imbalance, the gain and/or phase imbalance may be calibrated before the DC offset calibration.

RX Communication Operation Mode

Referring to FIGS. 1 and 9, during a normal RX communication operation mode, either one of the first and second RX channels or both channels can be utilized. For example, for the first RX channel, the antenna 1115, the RX front end 1120, the LNA 1130, the MUX 1160, and one embodiment of the RX channel frequency converter 550, the RX baseband module 590, the ADC 595, the RX pre-distortion module 520 and the baseband processor 195, all of which create a RX channel, are utilized according to one aspect of the present invention.

The RX calibration processor 540 supplies the final or optimum error parameters (e.g., I_ofs 541, Q_ofs 542, α 543, sin(Θ) 544 and cos(Θ) 545) determined during the RX calibration mode to the RX pre-distortion module 520.

Referring to the block diagram in FIGS. 1 and 9, according to one aspect of the present invention, during the normal RX communication operation, an RF communication signal received from the antenna 1115 is applied to the RX front end 1120 and then to the LNA 1130, which amplifies the signal. When the MUX 1160 selects the LNA 1130, this communication signal is applied to the RX channel frequency converter 550, which down converts the communication signal and provides I and Q baseband communication signals to the RX baseband module 590, which filters out-of-bound signals in the communication signals. The ADC 595 receives the filtered I and Q baseband communication signals and converts them from analog form into digital form.

The RX pre-distortion module 520 receives digitized I and Q baseband communication signals from the ADC 595 and adjusts the communication signals for any gain and phase imbalance and any I and Q DC offsets using the final or optimum error parameters (I_ofs 541, Q_ofs 542, α 543 and Θ 546 of sin(Θ) 544 and cos(Θ) 545) determined during the off-line RX calibration mode. The RX pre-distortion module 520 provides corrected I and Q baseband communication signals to the baseband processor 195 for further processing.

A second channel including the antenna 1215, the RX front end 1220, the LNA 1230, the MUX 1260, and another embodiment of the RX channel frequency converter 550, the RX baseband module 590, the ADC 595, the RX pre-distortion module 520 and the baseband processor 195, may be also utilized according to another aspect of the present invention.

While the final or optimum error parameters are used during the normal RX communication operation mode to compensate for the errors in the communication signals, the error parameters are not calculated, evaluated or determined during the RX communication operation mode. These error parameters are determined during the RX calibration mode.

Exemplary Features

According to one embodiment, the present invention provides the following features:

- The calibration procedure is performed during off-line TX and RX calibration modes, and it is not performed during the normal operation of the transmitter or receiver (i.e., the normal TX or RX communication operation mode).
- A special calibration signal (instead of the communication signal) is applied for the purpose of performing the calibration.
- The actual errors in the communication signals are not measured. The error terms are not measured from an observation of the output of the envelope detector. All that can be determined from the detector output is that there is an error produced by one or more of the error mechanisms (e.g., gain or phase imbalance or DC offset). The effect of the error mechanisms is observed at the detector output and is independently minimized.
- No special timing between the I and Q signals and the output of the envelope detector is required. These can be at entirely different sample rates and sample times.
- There is no corruption of the calibration accuracy by systematic errors. When the error signal amplitude (e.g., VD_ofs and VD_quad) is minimized, the error is minimized. The dynamic range of the envelope detector may limit the calibration accuracy.
- The present invention reduces processing overhead by performing calibration off-line. A transceiver, a transmitter and a receiver of the present invention consume less power, require less circuitry and lower cost compared to a system that performs on-line calibration.

Exemplary Calibration Procedure

Now referring to FIGS. 1, 4(b), 5, 6, and 9, Table 2 below illustrates an exemplary calibration procedure according to one aspect of the present invention:

TABLE 2

| Index | Action | Settings (RF SPI) | Result |
|---|---|---|---|
|  | Enable TX baseband filter measurement |  |  |
|  | Read filter measurement result |  |  |
| 1 | Enable TX calibration mode | For example, RX baseband (BB) MUX 1380 in FIG. 1 set to select the envelope detector 1370 LO 1045 in TX mode RX RF disabled (e.g., RX front ends 1120, 1220 are disabled) TX front end 1020 disabled | Ready for TX calibration |
| 2 | Apply calibration tones to TX pre-distortion module inputs 101 and 102 in FIG. 5 | Baseband chip (including, for example, one or more of the following: the TX calibration receiver 120, the TX calibration processor 130, the TX microprocessor 180, the baseband processor 195, TX pre-distortion module 140 and the DAC 145 shown in FIG. 5 and other devices for the baseband region 509 in FIG. 9) set to produce calibration tone |  |
| 3 | Sample the output of the envelope detector 1370 in FIG. 1 at the output RX_A Q by the ADC 210 and 220 in FIG. 6 | Baseband chip in FFT mode |  |

TABLE 2-continued

| Index | Action | Settings (RF SPI) | Result |
|---|---|---|---|
| 4 | Iteratively adjust I/Q DC offset coefficients I_ofs 131 and Q_ofs 132 in FIG. 5 to minimize DC offset (e.g., VD_ofs 121 in FIG. 5 associated with undesired sideband 4040b at $F_{BB}$ in FIG. 4(b)) | | |
| 5 | Iteratively adjust quadrature error parameters $\alpha$ 133 and $\Theta$ 136 of sin($\Theta$)) 134 and cos($\Theta$) 135 to minimize quadrature error (e.g., VD_quad 122 associated with undesired sideband 4030b at $2F_{BB}$) | | |
| 6 | Store TX calibration data (e.g., final error parameters that minimize DC offset and quadrature error - I_ofs 131, Q_ofs 132, $\alpha$ 133 and $\Theta$ 136 of sin($\Theta$) 134 and cos($\Theta$) 135) | | |
| 7 | Disable TX calibration mode | For example, RX BB MUX 1380 set to select the RX baseband module 1150 LO 1045 in TX mode RX RF disabled (e.g., RX front ends 1120, 1220 are disabled) TX front end 1020 disabled | |
| 8 | Enable RX calibration mode | RX RF MUX 1160 and 1260 set to TX-RX loopback (to select the output 1032) LO in TX and RX mode (LO drives all mixers 1041, 1043, 1141, 1143, 1241 and 1243) RX RF disabled (e.g., RX front ends 1120, 1220 are disabled) TX front-end 1020 disabled TX_RX loopback (e.g., LNAs 1130 and 1230) set to minimum gain Gain of RX baseband modules 1150 and 1250 set to minimum | Ready for RX calibration |
| 9 | Apply Calibration tones to TX pre-distortion module inputs 101 and 102 in FIG. 5 (which are inputs 101 and 102 of TX module 159 in FIG. 9) | Baseband chip (including, for example, one or more of the following: the ADC 595, the RX pre-distortion module 520, the RX calibration receiver 530, the RX calibration processor 540, the RX microprocessor 580, and the baseband processor 195 and other devices for the baseband region 115 in FIG. 5) set to output calibration tone | |
| 10 | Sample RX_A I and RX_A Q in FIG. 1 (or sample the output of the RX baseband module 590 by the ADC 595 in FIG. 9) | Baseband chip FFT mode | |
| 11 | Adjust RF baseband gain for desired ADC operating point | Baseband chip sets RX baseband gain through SPI | |
| 12 | Iteratively adjust I/Q DC offset coefficients I_ofs 541 and Q_ofs 542 in FIG. 9 to minimize DC offset (e.g., VD_ofs 532 in FIG. 9 associated with undesired sideband) | Baseband chip in RX calibration mode | |
| 13 | Iteratively adjust quadrature error parameters $\alpha$ 543 and $\Theta$ 546 of sin($\Theta$) 544 and cos($\Theta$) 545 to minimize quadrature error (e.g., VD_quad 532 associated with undesired sideband) | | |
| 14 | Store RX calibration data (e.g., final error parameters that minimize DC offset and quadrature error - I_ofs | | |

TABLE 2-continued

| Index | Action | Settings (RF SPI) | Result |
|---|---|---|---|
| | 541, Q_ofs 542, α 543 and Θ 546 of sin(Θ) 544 and cos(Θ) 545) | | |
| 15 | Change TX–RX loopback gain to next setting (e.g., adjust gain of LNAs 1130 and 1230 in FIG. 1) | Baseband chip sets RX baseband gain through SPI | |
| 16 | Repeat steps 10 through 15 until all 4 RX calibration points are complete | | |
| 17 | Disable RX calibration mode | For example, RX RF MUX 1160 and 1260 set to RX RF (i.e., set to select LNAs 1130 and 1230) LO 1141, 1143, 1241, 1243 in RX mode RX RF enabled (e.g., RX front ends 1120, 1220 are enabled) TX front end 1020 disabled TX_RX loopback (e.g., LNAs 1130 and 1230) set to minimum gain | |

The blocks, modules and devices shown in previous figures can be combined or divided, or additional items may be added to the devices described above. For instance, while the RF transceiver system 1010 in FIG. 1, the RF transceiver system 101 in FIG. 5 and the RF transceiver system 501 in FIG. 9 are identified with certain blocks, modules and/or devices in accordance with one embodiment of the present invention, some of these items can be combined with other blocks, modules and/or devices according to another embodiment, or these items can be further divided into additional blocks, modules and/or devices according to yet another embodiment. The term block can refer to a module or device, the term module can refer to a block or device, and the term device can refer to a block or module.

Furthermore, some of the items shown in FIGS. 1, 5-12 may be removed, and additional items may be added. For example, in FIG. 5, the TX baseband module 190 may be implemented within the TX channel frequency converter 150, the DAC 145 may be implemented within the TX pre-distortion module 140. The baseband processor 195 may incorporate the devices and/or functionality of some or all of the TX pre-distortion module 140, the DAC 145, the TX baseband module 190, the TX calibration receiver 120, the TX calibration processor 130 and the TX microprocessor 180. These different embodiments can be viewed as the same or equivalent.

In FIG. 9, the RX baseband module 590 may be implemented within the RX channel frequency converter 550, the ADC 595 may be implemented within the RX pre-distortion module 520 or the RX baseband module 590. The baseband processor 195 may incorporate the devices and/or functionality of some or all of the RX pre-distortion module 520, the ADC 595, the RX baseband module 590, the RX calibration receiver 530, the RX calibration processor 540 and the RX microprocessor 580. Each of the transceiver systems 1010, 101 and 501 may be implemented in a single or multiple integrated circuit chips. The transceiver systems may be monolithically formed on one or more integrated circuit chips using bipolar complementary metal oxide semiconductor (Bi-CMOS) silicon-germanium (SiGe) processing techniques. These different embodiments can be viewed as the same or equivalent.

Referring to FIG. 9, according to one embodiment of the present invention, the RX module 502 may be calibrated without using the TX module 159 by supplying a calibration signal to the RX channel frequency converter 550 from a source other than the TX module 159 (e.g., a block 559). If the TX module 159 is not used during the RX calibration, then the RX calibration can be performed independently of the TX calibration. A TX calibration and an RX calibration may be performed sequentially in any order (e.g., TX calibration first or RX calibration first) or may be performed simultaneously. In yet another embodiment, a calibration signal may be supplied from a source other than the RX calibration processor 540 (e.g., a block 549). If the RX calibration uses a separate transmitter section to supply a calibration signal to the RX channel frequency converter 550, such transmitter section is calibrated so that it does not contribute error.

In another embodiment of the present invention, a transceiver system, a transmitter or a receiver may utilize a complex calibration signal generator, instead of the calibration tone generator 330, that can generate a complex signal (e.g., a broadband signal) rather than a tone (e.g., a sinusoidal signal having one frequency). Such calibration signal generator may be utilized in the TX calibration processor 130 of FIG. 5 or the RX calibration processor 540 of FIG. 9. The undesired sidebands for such a calibration signal may be more complex than those shown in FIG. 4(b).

According to one aspect of the present invention, during a TX calibration mode, the TX calibration processor 130 may generate more than one calibration signal, each calibration signal having a different frequency. The process of determining the TX error parameters (I_ofs, Q_ofs, α, and Θ) described above may be repeated for each of the TX calibration signals so that each set of the error parameters is associated with its corresponding calibration signal or its frequency.

According to one aspect of the present invention, during a RX calibration mode, the RX calibration processor 540 may generate more than one calibration signal, each calibration signal having a different frequency. The process of determining the RX error parameters (I_ofs, Q_ofs, α, and Θ) described above may be repeated for each of the RX calibration signals so that each set of the error parameters is associated with its corresponding calibration signal or its frequency.

In another embodiment of the present invention, the TX pre-distortion module 140 may replace the RX pre-distortion module 520 so that the TX pre-distortion module 140 is used for both TX calibration and RX calibration. Furthermore, the TX calibration processor 130 may replace the RX calibration processor 540 so that the TX calibration processor 130 is used for both TX calibration and RX calibration. The TX microprocessor 180 may replace the RX microprocessor 580 so that the TX microprocessor 180 is used for both TX calibration and RX calibration. In addition, the TX baseband module 190 may replace the RX baseband module 590 so that the TX baseband module 190 is used for both TX calibration and RX calibration.

Furthermore, according to one embodiment of the present invention, one LO may be used for some or all of the LO's utilized in FIGS. 1, 5 and 9. For example, in FIG. 1, the LO 1045, the LO 1145 and the LO 1245 may be the same LO. In FIGS. 5 and 9, the LO 155 and the LO 555 may be the same LO.

According to one aspect of the present invention, the terms transmit, transmitter and the like, including the components thereof and items named with such terms, may be used for transmission as well as reception of signals, and the terms receive, receiver and the like, including the components thereof and items named with such terms, maybe used for reception as well as transmission of signals.

Referring to FIG. 1, each of the MUX 1380, the MUX 1160 and the MUX 1260 may be another type of selector according to one embodiment of the present invention. A selector may be a device or simply a node connection (either wired or wireless).

The previous description is provided to enable any person skilled in the art to practice the various embodiments described herein. Various modifications to these embodiments will be readily apparent to those skilled in the art, and generic principles defined herein may be applied to other embodiments. Many changes and modifications may be made to the invention, by one having ordinary skill in the art, without departing from the spirit and scope of the invention.

The invention is not intended to be limited to the embodiments shown and described herein, but is to be accorded the full scope consistent with the described invention, wherein reference to an element in the singular is not intended to mean "one and only one" unless specifically stated, but rather "one or more."

For example, while the description above refers to a "signal," a signal may be one or more signals. For instance, a communication signal may refer to a signal including I and Q communication signals. A communication signal is not limited to I and Q communication signals and may be other types of signals. Furthermore, the term "input" may refer to a single input or multiple inputs, and the term "output" may refer to a single output or multiple outputs.

All structural and functional equivalents to the elements of the various embodiments described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description. Furthermore, headings and subheadings are inserted as a matter of convenience and shall not limit the scope of the present invention.

What is claimed is:

1. A transceiver system for communication having a transmit channel and a receive channel, the transceiver system comprising:

a transmit pre-distortion module including a first transmit input configured to receive a first transmit calibration signal during a transmit calibration mode and configured to receive a first transmit communication signal during a transmit communication operation mode, the transmit pre-distortion module further including a second transmit input configured to receive one or more transmit calibration adjustment signals to adjust the first transmit calibration signal during the transmit calibration mode and configured to receive one or more transmit calibration adjustment signals to adjust the first transmit communication signal during the transmit communication operation mode, the transmit pre-distortion module further including a first transmit output configured to provide a second transmit calibration signal during the transmit calibration mode and configured to provide a second transmit communication signal during the transmit communication operation mode;

a transmit channel frequency converter coupled to the transmit pre-distortion module, the transmit channel frequency converter including a third transmit input configured to receive a third transmit calibration signal during the transmit calibration mode and configured to receive a third transmit communication signal during the transmit communication operation mode, the transmit channel frequency converter further including a fourth transmit input configured to receive a transmit reference signal, the transmit channel frequency converter further including a second transmit output configured to provide a fourth transmit calibration signal during the transmit calibration mode and configured to provide a fourth transmit communication signal during the transmit communication operation mode, the fourth transmit calibration signal comprising a frequency-translated version of the third transmit calibration signal, the fourth transmit communication signal comprising a frequency-translated version of the third transmit communication signal;

a transmit calibration module coupled to the transmit channel frequency converter and the transmit pre-distortion module, the transmit calibration module including a fifth transmit input configured to receive a fifth transmit calibration signal during the transmit calibration mode, the transmit calibration module further including a third transmit output configured to provide the one or more transmit calibration adjustment signals for the first transmit calibration signal and the one or more transmit calibration adjustment signals for the first transmit communication signal, the transmit calibration module further including a fourth transmit output configured to provide a sixth transmit calibration signal during the transmit calibration mode;

a receive channel frequency converter including a first receive input configured to receive a first receive calibration signal during a receive calibration mode and configured to receive a first receive communication signal during a receive communication operation mode, the receive channel frequency converter further including a second receive input configured to receive a receive reference signal, the receive channel frequency converter further including a first receive output configured to provide a second receive calibration signal during the receive calibration mode and configured to provide a second receive communication signal during the receive communication operation mode, the second receive calibration signal comprising a frequency-translated version of the first receive calibration signal, the second receive communication signal comprising a frequency-translated version of the first receive communication signal;

a receive pre-distortion module coupled to the receive channel frequency converter, the receive pre-distortion module including a third receive input configured to receive a third receive calibration signal during the receive calibration mode and configured to receive a third receive communication signal during the receive communication operation mode, the receive pre-distortion module further including a fourth receive input configured to receive one or more receive calibration adjustment signals to adjust the third receive calibration signal during the receive calibration mode and configured to receive one or more receive calibration adjustment signals to adjust the third receive communication signal during the receive communication operation mode, the receive pre-distortion module further including a second receive output configured to provide a fourth receive calibration signal during the receive calibration mode and configured to provide a fourth receive communication signal during the receive communication operation mode; and a receive calibration module coupled to the receive pre-distortion module, the receive calibration module including a fifth receive input configured to receive a fifth receive calibration signal during the receive calibration mode, the receive calibration module further including a third receive output configured to provide the one or more receive calibration adjustment signals for the third receive calibration signal and the one or more receive calibration adjustment signals for the third receive communication signal, the receive calibration module further including a fourth receive output configured to provide a sixth receive calibration signal during the receive calibration mode.

2. A transceiver system of claim 1, wherein the transmit calibration module includes a calibration signal generator.

3. A transceiver system of claim 1, wherein the transmit calibration module includes a plurality of filters configured to separate and provide a first calibration error signal associated with a transmit calibration signal and a second calibration error signal associated with the transmit calibration signal, wherein the first and second calibration error signals are not based on any transmit communication signal.

4. A transceiver system of claim 3, wherein the first calibration error signal corresponds to an error due to gain and/or phase imbalance, and the second calibration error signal corresponds to an error due to DC offset.

5. A transceiver system of claim 1 further including a multiplexer coupled to the receive channel frequency converter, the multiplexer configured to select the first receive calibration signal or the first receive communication signal.

6. A transceiver system of claim 1, wherein each of the first transmit input, the second transmit input, the third transmit input, the third receive input, the fourth receive input and the fifth receive input includes a plurality of input, wherein each of the first transmit output, the third transmit output, the fourth transmit output, the first receive output, the second receive output, the third receive output and the fourth receive output includes a plurality of output.

7. A transceiver system of claim 6, wherein each of the first transmit input, the third transmit input, the third receive input, and the fifth receive input is configured to receive in-phase and quadrature-phase signals, wherein each of the first transmit output, the fourth transmit output, the first receive output, the second receive output, and the fourth receive output is configured to provide in-phase and quadrature-phase signals, wherein each of the second transmit input and the fourth receive input is configured to receive in-phase and quadrature-phase calibration values and DC offset calibration values, and wherein each of the third transmit output and the third receive output is configured to provide in-phase and quadrature-phase DC offset calibration values and gain and phase calibration values.

8. A transceiver system of claim 1, wherein the transmit calibration module is configured not to receive any transmit communication signal, and the receive calibration module is configured not to receive any receive communication signal.

9. A transceiver system of claim 1 further comprising a selector coupled to the receive channel frequency converter and the transmit channel frequency converter, wherein the receive calibration module is coupled to the transmit pre-distortion module, wherein during the receive calibration mode, the transceiver system is configured to provide the sixth receive calibration signal to the transmit pre-distortion module, the first transmit input of the transmit pre-distortion module is configured to receive the sixth receive calibration signal, the first transmit output of the transmit pre-distortion module is configured to provide a seventh receive calibration signal based on the sixth receive calibration signal, the third transmit input of the transmit channel frequency converter is configured to receive an eighth receive calibration signal based on the seventh receive calibration signal, and the second transmit output of the transmit channel frequency converter is configured to provide a ninth receive calibration signal based on the eighth receive calibration signal, and the selector is configured to receive the ninth receive calibration signal and to provide the first receive calibration signal to the receive channel frequency converter.

10. A transceiver system of claim 1, wherein the transmit pre-distortion module is the receive pre-distortion module so that the first transmit input, which is the third receive input, is configured to receive the first transmit calibration signal during the transmit calibration mode, configured to receive the first transmit communication signal during the transmit communication operation mode, configured to receive the third receive calibration signal during the receive calibration mode and configured to receive the third receive communication signal during the receive communication operation mode, the second transmit input, which is the fourth receive input, is configured to receive one or more transmit calibration adjustment signals to adjust the first transmit calibration signal during the transmit calibration mode, configured to receive one or more transmit calibration adjustment signals to adjust the first transmit communication signal during the transmit communication operation mode, configured to receive one or more receive calibration adjustment signals to adjust the third receive calibration signal during the receive calibration mode and configured to receive one or more receive calibration adjustment signals to adjust the third receive communication signal during the receive communication operation mode, the first transmit output, which is the second receive output, is configured to provide the second transmit calibration signal during the transmit calibration mode, configured to provide the second transmit communication signal during the transmit communication operation mode, configured to provide the fourth receive calibration signal during the receive calibration mode and configured to provide the fourth receive communication signal during the receive communication operation mode.

11. A transceiver system of claim 1, wherein the transmit calibration module includes a detector, calibration receiver, a calibration processor and a microprocessor.

12. A transceiver system of claim 11, wherein the receive calibration module includes the same calibration processor and the same microprocessor.

13. A transceiver system of claim 1 further comprising a selector, wherein the transmit calibration module includes a detector, and the selector is coupled to the detector and the receive channel frequency converter.

14. A transceiver system of claim 1, wherein the third transmit calibration signal is the second transmit calibration signal, the third transmit communication signal is the second transmit communication signal, the fifth transmit calibration signal is the fourth transmit calibration signal, the sixth transmit calibration signal is the first transmit calibration signal,
wherein the third receive calibration signal is the second receive calibration signal, the third receive communication signal is the second receive communication signal, the fifth receive calibration signal is the fourth receive calibration signal, and the first receive calibration signal is generated based on the sixth receive calibration signal.

15. A transceiver system for providing a transmit calibration mode, a transmit communication operation mode, a receive calibration mode and a receive communication operation mode, the transceiver system comprising:
a transmit sub-system including:
a transmit channel frequency converter configured for coupling to or coupled to a calibration signal generator, the calibration signal generator for generating one or more calibration signals, the transmit channel frequency converter including a first transmit input configured to receive a first transmit calibration signal during a transmit calibration mode, the first transmit input configured to receive a first receive calibration signal during a receive calibration mode, the first transmit input configured to receive a first transmit communication signal during a transmit communication operation mode, the transmit channel frequency converter further including a second transmit input configured to receive a transmit reference signal, the transmit channel frequency converter further including a first transmit output configured to provide a second transmit calibration signal during the transmit calibration mode, the first transmit output configured to provide a second receive calibration signal during the receive calibration mode, and the first transmit output configured to provide a second transmit communication signal during the transmit communication operation mode, the second transmit calibration signal comprising a frequency-translated version of the first transmit calibration signal, the second receive calibration signal comprising a frequency-translated version of the first receive calibration signal, the second transmit communication signal comprising a frequency-translated version of the first transmit communication signal; and
a signal detector coupled to the transmit channel frequency converter, the signal detector configured to receive a transmit calibration signal during the transmit calibration mode, and
a receive sub-system coupled to the transmit sub-system, the receive sub-system including:
a selector coupled to the transmit channel frequency converter, the selector including an input and an output, the input of the selector configured to receive a third receive calibration signal during the receive calibration mode, the input of the selector configured to receive a first receive communication signal during a receive communication operation mode; and
a receive channel frequency converter coupled to the selector, the receive channel frequency converter including a first receive input coupled to the output of the selector, the first receive input configured to receive a fourth receive calibration signal during the receive calibration mode, the first receive input configured to receive a second receive communication signal during the receive communication operation mode, the receive channel frequency converter further including a second receive input configured to receive a receive reference signal, the receive channel frequency converter further including a first receive output configured to provide a fifth receive calibration signal during the receive calibration mode, the first receive output configured to provide a third receive communication signal during the receive communication operation mode, the fifth receive calibration signal comprising a frequency-translated version of the fourth receive calibration signal, the third receive communication signal comprising a frequency-translated version of the second receive communication signal.

16. A transceiver system of claim 15, wherein the transmit sub-system further comprises a transmit baseband module coupled to the transmit channel frequency converter, the transmit baseband module including one or more filters, the transmit baseband module including an input configured to receive a third transmit calibration signal during the transmit calibration mode, the input of the transmit baseband module configured to receive a sixth receive calibration signal during the receive calibration mode, the input of the transmit baseband module configured to receive a third transmit communication signal during the transmit communication operation mode, the transmit baseband module further including an output configured to provide a fourth transmit calibration signal during the transmit calibration mode, the output of the transmit baseband module configured to provide a seventh receive calibration signal during the receive calibration mode, the output of the transmit baseband module configured to provide a fourth transmit communication signal during the transmit communication operation mode, and
wherein the receive sub-system further comprises a receive baseband module coupled to the receive channel frequency converter, the receive baseband module including one or more filters, the receive baseband module including an input configured to receive an eighth receive calibration signal during the receive calibration mode, the input of the receive baseband module configured to receive a fourth receive communication signal during the receive communication operation mode, the receive baseband module further including an output configured to provide a ninth calibration signal during the receive calibration mode, the output of the receive baseband module configured to provide a fifth receive communication signal during the receive communication operation mode.

17. A transceiver system of claim 16, wherein the receive sub-system further comprises a selector coupled to the signal detector and the receive baseband module.

18. A transceiver system of claim 15, wherein the transmit channel frequency converter is configured for coupling to a transmit pre-distortion module and a transmit calibration module,
wherein the receive channel frequency converter is configured for coupling to a receive pre-distortion module and a receive calibration module.

* * * * *

UNITED STATES PATENT AND TRADEMARK OFFICE
CERTIFICATE OF CORRECTION

PATENT NO. : 7,620,373 B2
APPLICATION NO. : 11/590278
DATED : November 17, 2009
INVENTOR(S) : Jean-Pierre Joseph Cole et al.

It is certified that error appears in the above-identified patent and that said Letters Patent is hereby corrected as shown below:

IN THE SPECIFICATION:

In Column 22, line 33: Replace "On" with --One--.

Signed and Sealed this

Twenty-sixth Day of October, 2010

David J. Kappos
*Director of the United States Patent and Trademark Office*